United States Patent [19]
Poppen

[11] Patent Number: 5,916,299
[45] Date of Patent: Jun. 29, 1999

[54] METHOD FOR DETERMINING EXITS AND ENTRANCES FOR A REGION IN A NETWORK

[75] Inventor: Richard Frederick Poppen, San Jose, Calif.

[73] Assignee: Etak, Inc., Menlo Park, Calif.

[21] Appl. No.: 08/756,258

[22] Filed: Nov. 25, 1996

[51] Int. Cl.[6] .................................................. G06F 17/00
[52] U.S. Cl. .................... 701/202; 701/201; 705/400; 364/400
[58] Field of Search .............................. 364/400; 370/254, 370/255, 256, 351; 395/200.71; 701/25, 26, 201, 202; 705/400

[56] References Cited

U.S. PATENT DOCUMENTS

| | | | |
|---|---|---|---|
| 4,984,168 | 1/1991 | Neukrichner et al. | 364/449 |
| 5,031,093 | 7/1991 | Hasegawa | 395/200.71 |
| 5,170,353 | 12/1992 | Verstraete | 701/202 |
| 5,276,768 | 1/1994 | Bander | 395/10 |
| 5,285,391 | 2/1994 | Smith, Jr. et al. | 701/200 |
| 5,452,294 | 9/1995 | Naterajan | 370/351 |
| 5,495,479 | 2/1996 | Galaand et al. | 370/404 |
| 5,521,910 | 5/1996 | Matthews | 370/256 |
| 5,523,950 | 6/1996 | Petersin | 701/117 |
| 5,600,638 | 2/1997 | Bertun et al. | 370/351 |
| 5,712,788 | 1/1998 | Liaw et al. | 701/209 |
| 5,729,458 | 3/1998 | Poppen | 705/400 |
| 5,845,228 | 12/1998 | Uekawa et al. | 701/209 |

FOREIGN PATENT DOCUMENTS

WO 88/09974   12/1988   WIPO.

OTHER PUBLICATIONS

*Graphs, Networks and Algorithms,* Swamy, M.N.S. and Thulasiraman, K., published by John Wiley & Sons, Inc. (1981).

Primary Examiner—Edward R. Cosimano
Attorney, Agent, or Firm—Fliesler, Dubb, Meyer & Lovejoy LLP

[57] ABSTRACT

A system is employed for finding a path in a network between an origin in a first region and a destination in a second region. In finding this path, the system finds three paths: a path between the origin and an exit node for the first region, a path between an entrance node for the second region and the destination, and a path between the exit node and the entrance node. These three paths are combined to construct the path between the origin and the destination. A set of nodes for use as exit nodes or entrance nodes for a region may be identified by identifying a set of boundary nodes for the region and identifying a set of target nodes. The target nodes are each separated from the region by a sufficient cost. The set of target nodes may serve as a set of exit nodes or entrance nodes. The set of target nodes may also be modified to improve its operation as a set of exit nodes or entrance nodes.

57 Claims, 19 Drawing Sheets

METHOD FOR DETERMINING EXITS AND ENTRANCES FOR A REGION IN A NETWORK

CROSS REFERENCE TO RELATED APPLICATIONS/PATENTS

This Application is related to the following Application: U.S. patent application Ser. No. 08/756,263, entitled USING MULTIPLE LEVELS OF COSTS FOR A PATHFINDING COMPUTATION, by Richard F. Poppen, filed Nov. 25, 1996 and now U.S. Pat. No. 5,893,081.

This related Application is incorporated herein by reference.

BACKGROUND OF THE INVENTION

A. Field of the Invention

The present invention is directed to a system for determining exits and entrances for a region in a network.

B. Description of the Related Art

Computers have revolutionized the idea of modeling systems for enhanced study and use of the systems. One example is the modeling of a system as a network. A network is defined in its most general sense as something that includes a number of paths that interconnect or branch out. Many systems that involve decisions can be modeled as a network. For example, a manufacturing process or a system of providing medical treatment can be modeled as a network of decision points and actions between decision points. This network can be represented in electronic form and stored on a processor readable storage medium so that software can be created for using the network model to study or use the system.

One example of a useful network that can be stored in electronic form is the electronic map, which includes geographically referenced electronic data quantifying a physical, social or economic system. The range of information included in electronic maps is unlimited; for example, electronic maps could include distances between elements, travel time, lot numbers, tax information, tourist information, processing time, waiting time, etc. Additionally, storing a map as a file on a computer allows for unlimited software applications to manipulate that data. One advantage of the computer readable geographic map is that it provides for storing and determining costs associated with various nodes and links in the map. Examples of such costs include time, distance, tolls paid, ease of turning, quality of scenery, etc.

Electronic maps, as well as other networks, can be used for pathfinding, which is a method for computing a route between an origin and a destination. A computer readable map that is used for pathfinding must carry information about the connectivity of a road network, including information about the ways in which pieces of road do or do not connect to each other. For example, such information may include where there are ordinary intersections, where there are overpasses, where turns are restricted, and so on. This information may be combined with cost information, so that a route with a specified cost parameter may be determined.

The process of finding a path may require a great deal of computation. Several schemes have been developed for improving the speed of such computations. Some schemes reduce the number of elements that are considered in a pathfinding exploration. Other schemes provide for ways of clustering or packing the data to be processed in files, so that the processing may be expedited. However, the prior art attempts to reduce processing time have not been sufficient in light of the size of many large databases.

Thus, there is a need for a system that further reduces the computation time needed to perform a pathfinding process.

SUMMARY OF THE INVENTION

The present invention, roughly described, provides for a system for constructing a set of nodes to be used in a pathfinding computation to reduce computation time. The set of nodes is associated with a first region in a processor readable representation of a network, which is stored on a processor readable medium. In operation, the system identifies a set of boundary nodes in the first region and identifies a set of target nodes. Each node in the set of target nodes is separated by a sufficient cost from the first region.

The set of nodes being identified may be a set of exit nodes for the first tile. The condition of sufficient cost may require that each node in the set of target nodes not be reached by a path from the first region without incurring a predetermined cost of at least a value C. Alternatively, sufficient cost may mean that each node in the set of target nodes resides in a region such that no node in the region may be reached by a path from the first region without incurring a predetermined cost of at least a value C.

The set of nodes being identified may be a set of entrance nodes for the first region. The condition of sufficient cost may then require that the first region not be reached by a path from any node in the set of target nodes without incurring a predetermined cost of at least a value C. Alternatively, sufficient cost may mean that each node in the set of target nodes resides in a region such that all of the nodes in the region may not be able to reach the first region by a path, without incurring a predetermined cost of at least a value C.

In order to identify the set of nodes associated with the first region, the system may modify the set of target nodes. One or more of the following operations may be executed by the system to modify the set of target nodes. A path between a node in the set of boundary nodes and a node in the set of target nodes may be determined. A node in the set of target nodes may be marked with a set of nodes in the set of boundary nodes. A node in the set of target nodes may be pushed back to identify a fork node, which may be marked with a set of nodes in the set of boundary nodes that also mark the node being pushed back. The fork node is then added to the set of target nodes, and the node being pushed back is deleted from the set of target nodes. Additionally, a node in the set of target nodes may be discharged.

In order to find a path between an origin node in a first region and a destination node in a second region, the following process may be performed. A first path is found between the origin and an exit node for the first region. A second path is found between an entrance node for the second region and the destination. A third path is found between the exit node and the entrance node. The three paths are then combined to construct a path from the origin to the destination.

DETAILED DESCRIPTION

Figure 1:
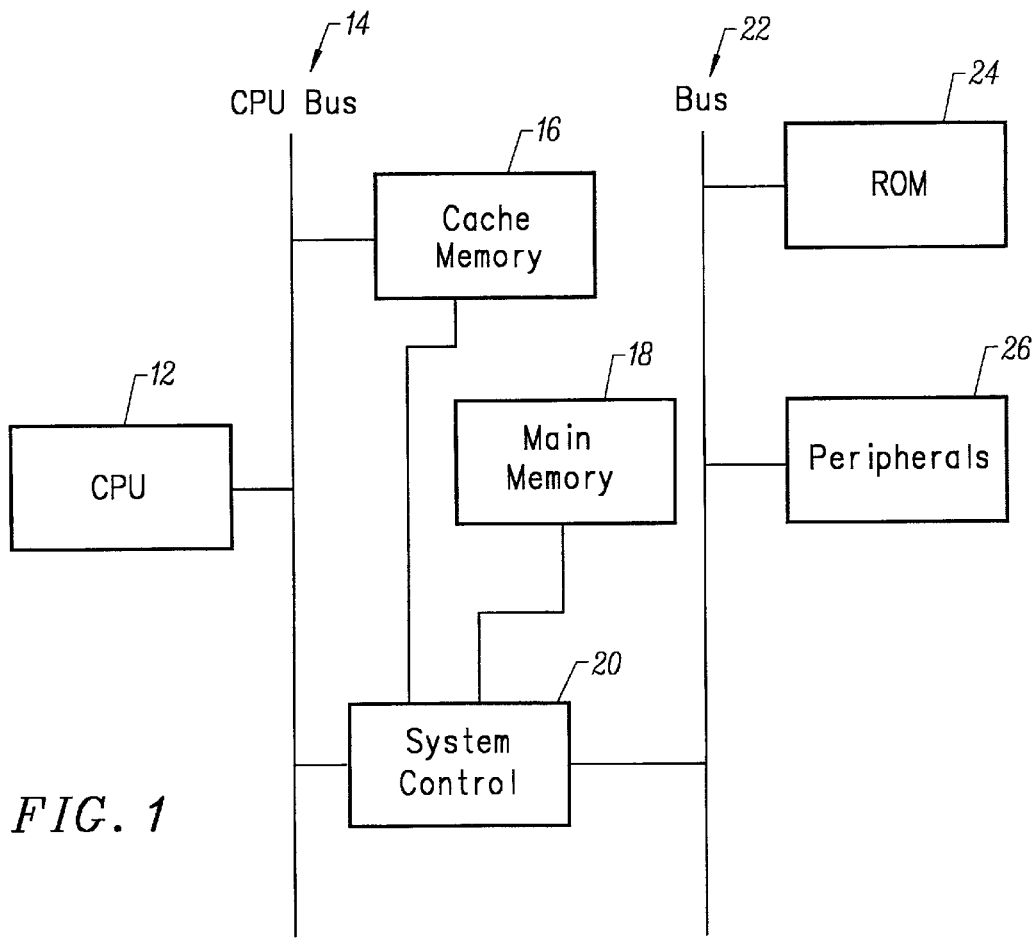
FIG. 1 is a block diagram of one exemplar hardware architecture that can be used to practice the present invention.

FIG. 1 is a symbolic block diagram of one exemplar hardware architecture that can be used to practice the present invention. The hardware includes CPU 12, which may be an Intel 80486 compatible CPU, Pentium Processor, or other suitable processor. CPU 12 has address, data and control lines which are connected to CPU bus 14. CPU bus 14 is also connected to a cache memory 16 and to main memory 18, both of which are controlled by system control logic 20. System control logic 20 is connected to CPU bus 14 and also to control, address and data lines of bus 22. Connected to bus 22 is ROM 24, which contains the system BIOS, and Peripherals 26, which can include a floppy, a hard-disk drive, CD-ROM drive or other peripheral device. Cache memory 16, DRAM memory 18, ROM 24, a CD-ROM and a floppy disk are all processor readable storage devices (or media). Various embodiments of the current invention use various degrees of software to perform the described methods. This software can reside on any suitable processor readable memory. Not depicted in FIG. 1, but included in the hardware, is a display and an input device such as a keyboard or pointing device. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

A processor readable representation of a network, such as an electronic map, is stored in one or more computer files which include the data necessary to construct a map. This data could include longitude and latitude data, addresses, distances, turning restrictions, driving times, highway exit numbers, descriptions of commercial uses of properties, etc. Although the above listed information can be found in an electronic map, it is possible to create an electronic map with only a subset of the above listed information or with other information.

Generally, a processor readable representation of a network to be used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links. A weighted graph is a graph in which each link (or edge) has a cost associated with it. Embodiments of the present invention may provide for associating the costs with the nodes, with the nodes and links, or associating costs with another element of the graph.

A network may be employed to represent a number of different environments, such as physical, economic, and social systems. For example, a manufacturing process may be represented as a network. In such a case, each node may represent a stage in the manufacturing process, and each link (or edge) may represent an alternative approach that can be taken for moving from one stage of the manufacturing process to another stage.

Figure 2A:
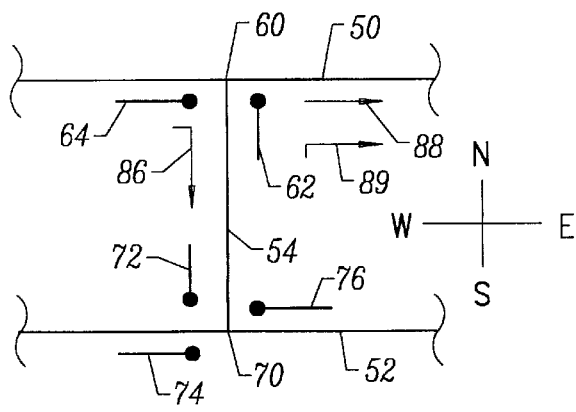
FIG. 2A is an example of a directed graph representing a part of an electronic map.

Alternatively, a geographic map may be represented as a network. FIG. 2A shows an exemplar network, including a directed graph, which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located, and the tail represents where a traveler would come from to reach that node. The node symbol is displaced from the actual intersection for purposes of visibility. For example, node 62 represents travel northbound on street 54 toward intersection 60. Node 64 represents travel eastbound on road 50 toward intersection 60. There is no node at intersection 60 to represent westbound travel on street 50 because street 50 is an eastbound one-way street. Thus, a traveler proceeding north on road 54 and reaching intersection 60 can only make a right turn. Node 72 represents arriving at intersection 70 by traveling south on street 54. Node 74 represents arriving at intersection 70 by traveling east on road 52. Node 76 represents arriving at intersection 70 by traveling west on road 52.

Links represent a path between nodes. For example, from node 64 a traveler can make a right turn at intersection 60 to enter road 54 or can proceed straight on road 50. Link 86 represents travel starting from intersection 60 on road 50 facing east, making a right turn at intersection 60 and proceeding south on road 54. Thus, link 86 connects node 64 to node 72. Link 88 connects node 64 to the next node on street 50 (not shown on FIG. 2A) and represents travel east along road 50, proceeding straight through intersection 60 without turning. Link 89 represents travel starting from intersection 60 on road 54 facing north, making a right turn at intersection 60 and proceeding east on road 50; therefore, link 89 connects node 62 to the next node on street 50 (not shown on FIG. 2A). FIG. 2A only shows links drawn for nodes 62 and 64. If links are drawn for all nodes, the directed graph would become too crowded and would be difficult to read. Thus, the directed graph is simplified and redrawn as in FIG. 2B.

Figure 2B:
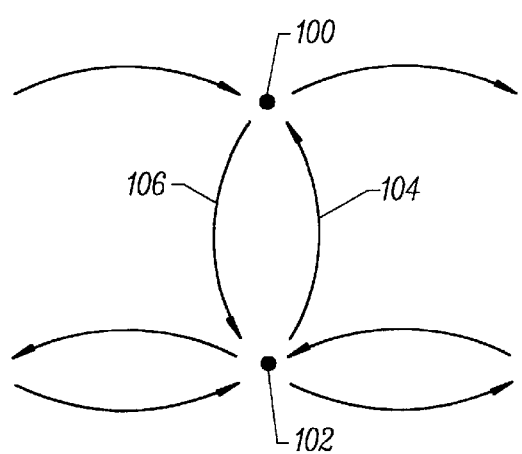
FIG. 2B is a second example of a directed graph representing a part of an electronic map.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102 represents nodes 72, 74 and 76. Note that the tails of the nodes are not drawn. The links are used to indicate directions of allowable travel. Link 104 indicates travel from intersection 70 to intersection 60 and link 106 indicates travel from intersection 60 to intersection 70. Turn restrictions and one-way streets are represented by the presence or absence of a link.

The directed graph of FIG. 2B is used to symbolically understand the data structure stored in a computer readable storage medium. A computer readable storage medium does not actually store an image of a directed graph. Rather, a data structure is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, or any other suitable subset of information.

Figure 3:
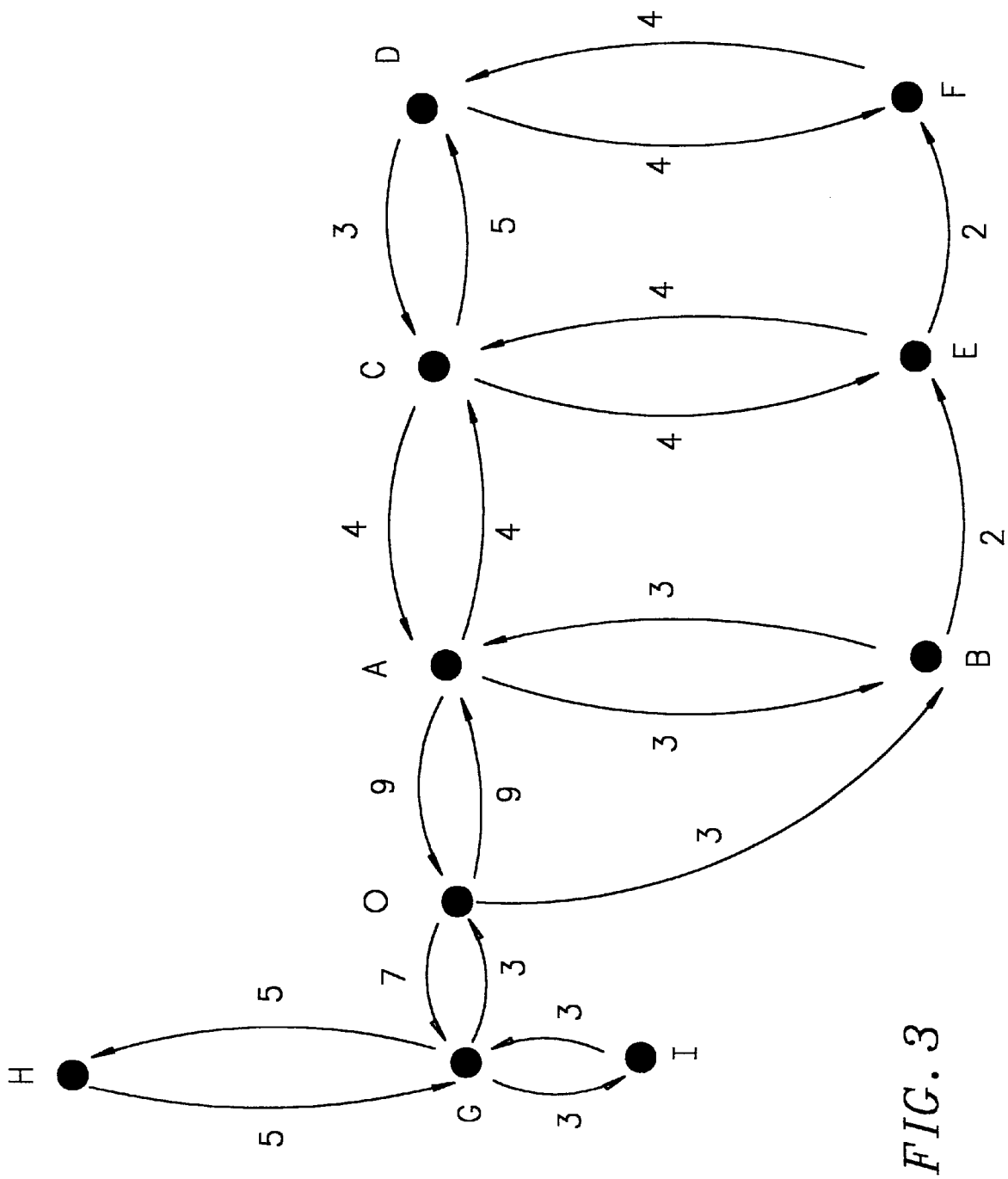
FIG. 3 is an example of a network.

FIG. 3 represents a directed graph for a portion of a processor readable representation of a network, such as an electronic map. For convenience, aspects of the present invention will be described with respect to an electronic map. However, the present invention is in no way limited to use with electronic maps, and embodiments of the present invention may be used with any type of processor readable representation of a network.

The directed graph depicted in FIG. 3 includes ten nodes (A, B, C, D, E, F, G, H, I, and O) and various links between the nodes. Each of the links include a number adjacent to the link. This number represents the cost of traveling along that link. For exemplar purposes only, the cost is assumed to be driving time. To help explain the current invention it is assumed that a driver in a car has an automotive navigation system in the car that performs pathfinding. The driver is located somewhere in the directed graph of FIG. 3 and at some point may decide to ask the navigation system to compute a path from one location to another. To explain how a path is computed, it is assumed that the driver has asked the system to compute a path from the origin O to the destination D.

Figure 4:
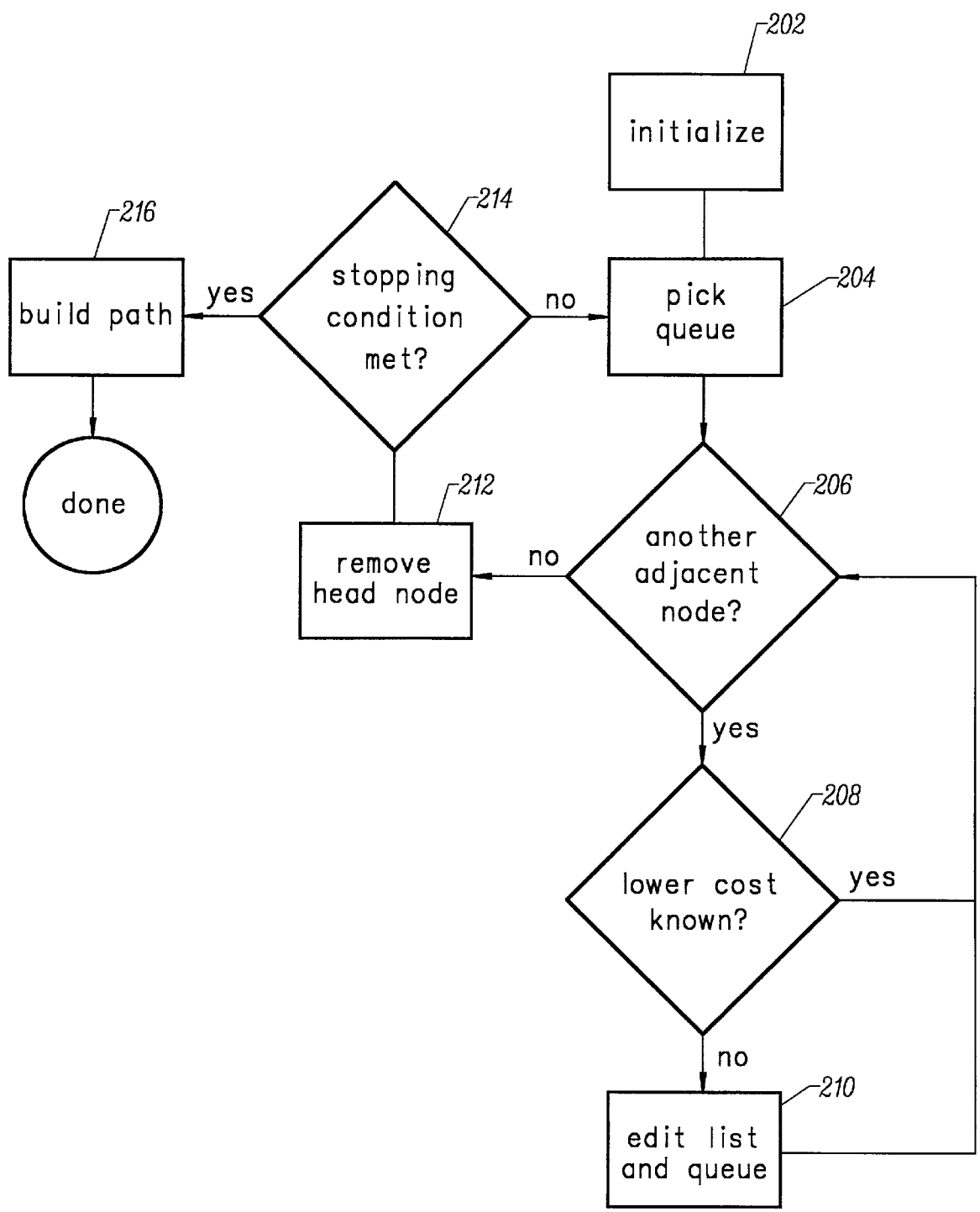
FIG. 4 is a flow chart describing a method for computing a path between an origin and destination.

FIG. 4 is a flow chart, which explains one type of pathfinding computation (also called a pathfinding exploration). The pathfinding computation of FIG. 4, which is based at least in part on the work of Edsger W. Dijkstra, is only one of many pathfinding methods that can be used with the present invention. One reference that discusses Dijkstra's method is M. N. S. Swamy and K. Thulasiraman, *Graphs, Networks, and Algorithms*, John Wiley & Sons (1981). In step 202 the system initializes the pathfinding computation. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the lowest known distance from the origin to the node plus an estimated cost of traveling from the node to the destination. There are various alternatives for estimating the cost for traveling from the node to the destination which is suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the known lowest cost path from the node to the destination. An alternative key includes using the sum of the known cost from the node to the destination plus an estimated cost from the origin to the node. The key described above which utilizes the estimated remaining costs produces an exploration from the origin that is biased in the direction of the destination. Similarly, an exploration from the destination is biased in the direction of the origin. Other methods of computing a key are suitable within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialize step 202 is completed, the visited lists are empty, the origin priority queue includes the origin and the destination priority queue includes the destination.

Once the system is initialized, the system chooses a queue according to a rule in step 204. There are many rules of picking a queue which are suitable for the present invention. In one system, the queue containing the element with the smallest key is chosen, with ties broken arbitrarily. In another system, the queue containing the fewest elements is chosen. Other examples of rules for choosing a queue include alternating between queues, choosing the origin queue for a time period, switching to the destination queue for a time period, switching back to the origin queue for a time period, etc. Since the queues are sorted by keys, the node with the smallest key will be at the head of the queue (also called the front or the top of the queue). This node is called the "head node." In the example discussed below, the method for picking a queue will be to alternate starting with the origin priority queue.

In step 206 the system looks for all nodes which are adjacent nodes to the head node of the chosen queue. Since the system just started, the only node in the origin priority queue is the origin. The adjacent nodes are those nodes which can be traveled to from the origin without going through any other nodes. The adjacent nodes for the origin O are nodes A, B and G. Since there are three adjacent nodes, the system arbitrarily picks one adjacent node. In step 208 the system determines whether there is a lower cost known on the visited list or the priority queue for the adjacent node picked. That is, the system determines the cost of traveling between the adjacent node and the head node by reading the data for those nodes and adds that cost to the cost already known for the head node. If there is a lower cost known (in step 208), the system loops back to step 206. In this case, the adjacent node picked is node A. The cost of traveling from the origin to node A is 9. Since the pathfinding computation has just started, node A is not on the visited list or the origin priority queue, so there is no known cost. Since there is no known cost, in step 210 the system edits the visited list and the priority queue to add node A and its cost. The method loops back to step 206 to determine whether any additional adjacent nodes have not been considered. In this case there are two adjacent nodes that have not been considered: B and G.

In step 208 the system determines whether there is a lower known cost for node B. The cost for traveling from origin to B is 3 and B does not appear on the priority queue or the visited list. In step 210 node B is added to the priority queue and the visited list. The system loops back to step 206 and considers node G, and since there is no known cost lower than the cost of going directly from the origin O to G, which is 7, G is added to the priority queue and the visited list. The system loops back to step 206 and determines that there are no adjacent nodes; therefore, in step 212 the head node, which is currently the origin, is removed from the priority queue.

Table 1 reflects the contents of the origin priority queue and the visited list at this point in the pathfinding computation. There are three nodes on the origin priority queue: B, G and A. Their keys represent the cost of traveling from the origin to that node. The visited list has three columns: node, cost and PREV. The node column lists the node identification, the cost column lists the lowest known cost of traveling from the origin to that node and the PREV column lists the previous node along the path from the origin to the listed node when traveling along the path utilizing the lowest known cost.

Table 1

| Origin Priority Queue | | Origin Visited List | | |
|---|---|---|---|---|
| Node | Key | Node | Cost | PREV |
| B | 3 | A | 9 | O |
| G | 7 | B | 3 | O |
| A | 9 | G | 7 | O |

In step 214 the system determines whether a stopping condition has occurred. There are many stopping conditions which are suitable for the present invention, for example, stopping when a node has been the head node on both the origin priority queue and the destination priority queue. Another stopping condition, which is the stopping condition used in this example, is stopping when the cost of traveling from the origin to the head node in the origin priority queue plus the cost of traveling from the head node of the destination priority queue to the destination is greater than or equal to the total cost of the best connection node. A connection node is a node that appears on the destination visited list and the origin visited list. Total cost of a connection node is the cost from the origin to the connection node plus the cost from the connection node to the destination. The best connection node is the connection node with the lowest total cost. In the present case there is no connection nodes so the stopping condition fails and, in step 204, the system picks a queue.

As discussed above, the algorithm for picking a priority queue in the present example is just alternating; therefore, the system picks the destination queue. In step 206 the system determines whether there are any nodes adjacent to the destination D. In the present example, there are two adjacent nodes, C and F. In step 208 the system looks at node C and determines whether there is a lower known cost. Since there is not, in step 210 the destination priority queue and visited list are edited to add node C and its cost. The method loops back to step 206 which determines that there is another adjacent node, node F. In step 208 the system determines that there is not a lower known cost known for F. In step 210 the destination priority queue and the destination visited list are edited to add node F. In step 206 the system determines there are no more adjacent nodes to node D and node D is removed from the destination priority queue in step 212. Table 2 reflects the state of the destination priority queue and visited list at this point in the method.

TABLE 2

| Dest. Priority Queue | | Dest. Visited List | | |
|---|---|---|---|---|
| Node | Key | Node | Cost | NEXT |
| F | 4 | F | 4 | D |
| C | 5 | C | 5 | D |

Since there are no connection nodes, the stopping condition fails (step 214) and the system picks the origin priority queue (step 204). From Table 1, it can be seen that the head node on the origin priority queue is node B. The adjacent nodes to node B are nodes A and E. In step 208, there is not a lower known cost for node A. Although node A does appear on the visited list with a cost of 9, the cost of traveling from the origin to node A via node B is 6. That is, the cost of traveling from O to B is 3 and the cost of traveling from B to A is 3. Thus, the cost of traveling from O to B to A is 6, which is lower than the cost of traveling from O directly to A. Therefore, in step 210 the visited list and priority queue are edited so that the cost of traveling to node A is 6 and the previous node in the visited list for node A is B. That is, to get to A from O at a cost of 6 one must travel through node B. In step 206 the system determines that there is another adjacent node, E. In step 208 the system determines that there is not a lower known cost for E and the priority queue and visited list are edited to include E. Table 3 reflects the current state of the origin priority queue and the visited list after node B was removed from the priority queue (step 212).

TABLE 3

| Origin Priority Queue | | Origin Visited List | | |
|---|---|---|---|---|
| Node | Key | Node | Cost | PREV |
| E | 5 | A | 6 | B |
| A | 6 | B | 3 | O |
| G | 7 | G | 3 | O |
| | | E | 5 | B |

At this point, the stopping condition fails because there is no connection node and the system picks the destination queue (step 204). In step 206 the system looks for adjacent nodes to the head node on the destination queue. Since the head node is node F, the only adjacent node is node E. The cost of traveling from E to F is 2. Thus, the cost of traveling from E to F to D is 6. In step 208 the system determines that there is not a lower known cost for traveling from E to D so the visited list and priority queue are updated accordingly. In step 206 the system determines that there is not another adjacent node and F is removed from the priority queue in step 212. Table 4 reflects the state of the destination priority queue and visited list at this point in the method.

TABLE 4

| Dest. Priority Queue | | Dest. Visited List | | |
|---|---|---|---|---|
| Node | Key | Node | Cost | NEXT |
| C | 5 | F | 4 | D |
| E | 6 | C | 5 | D |
| | | E | 6 | F |

In step 214 the system determines whether the stopping condition has been met. At this point there is a connection node. Node E is on the visited list for the origin and the destination. The total cost for node E is 11. That is, the cost from traveling from the origin to node E is 5 and from node E to the destination is 6. The stopping condition is not met because the cost of traveling from the origin to the head node in the origin priority queue (E) is 5 and the cost of traveling from the head node from the destination priority queue C to the destination is also 5. The sum of the two costs is 10 which is lower than the total cost for the connection node which is 11, therefore the stopping condition fails and the system picks the origin priority queue in step 204.

The head node in the origin priority queue is node E, which has two adjacent nodes: C and F. In step 208 the system determines whether a lower cost for traveling from the origin to F is already known. Since F is not in the origin visited list, there is no known cost and the cost of traveling from the origin to E to F, which is 7, is added to the origin priority queue and the visited list. In step 206 the system determines that there is another adjacent node, C, and in step 208 the system determines whether there is a known cost traveling to C from the origin already known. The cost of traveling from the origin to E to C is 9. Since there is no known lower cost for traveling from the origin to C, C is added to the priority queue and the visited list. At this point there are no more adjacent nodes to node E and node E is removed from the queue (step 212). Table 5 reflects the current state of the origin priority queue at this point in the method.

TABLE 5

| Origin Priority Queue | | Origin Visited List | | |
|---|---|---|---|---|
| Node | Key | Node | Cost | PREV |
| A | 6 | A | 6 | B |
| G | 7 | B | 3 | O |
| F | 7 | G | 3 | O |
| C | 9 | E | 5 | B |
| | | F | 7 | E |
| | | C | 9 | E |

In Step 214 the system determines that the stopping condition has been met. At this point there are three connection nodes. The total cost of connection node C is 14, the total cost of connection node F is 11 and the total cost of connection node E is 11. Since nodes E and F have the lowest total costs of all the connection nodes, nodes E and F are considered the best connection nodes. Various alternatives within the scope of the present invention may utilize other definitions of "best connection node." The cost of traveling from the origin to the head node on the origin priority queue is 6. The cost of traveling from the head node of the destination priority queue to the destination is 5. Therefore, the cost of traveling to and from the head nodes is eleven, which is equal to the total cost of the best cost connection node, which is also eleven. Thus, the stopping condition is met and the system builds the path in step 216.

The step of building the path is as follows. A rule selects some connection node. Once such rule is to choose the connection node K that minimizes the total cost (cost of the known path from the origin and the cost of the known path to the destination). The node K is looked up in the origin visited list and the previous node $P_1$ on the path from the origin is found. If $P_1$ is not the origin, then $P_1$ is looked up in the visited list and the previous node $P_2$ on the path from the origin is found. This continues until the origin is reached. Suppose the origin is reached as node $P_L$. Similarly, K is looked up in the destination visited list and the next node $N_1$ on the path to the destination is found. If $N_1$ is not the destination, then $N_1$ is looked up in the visited list. This continues until the destination is reached. Suppose the destination is reached as node $N_M$. At this point the path from the origin to the destination is known: it is the path from $P_L$ (the origin) to $P_{L-1}$, to $P_{L-2}$, . . . , to $P_2$, to $P_1$, to K, to $N_1$, to $N_2$ , . . . , to $N_{M-1}$, to $N_M$ (the destination).

In the present example, nodes E and F were both the best connection nodes. The system arbitrarily picks node E. Looking at the visited list in Table 5, the best known cost of traveling from the origin to node E involves traveling from node B to node E. Thus, the path being built will travel from B to E. The system then finds node B in the visited list and determines that the best path to node B is directly from the origin O. At this point the path built includes traveling from O to B to E. After the system reaches the origin, the system builds a path from the connection node to the destination. Looking at the visited list in Table 4, the best path from E to the destination involves traveling from E to F. Thus, F is added to the path. The visited list also indicates that the best path from F to D is directly from F to D. Thus, the path built is O-B-E-F-D.

Figure 5:
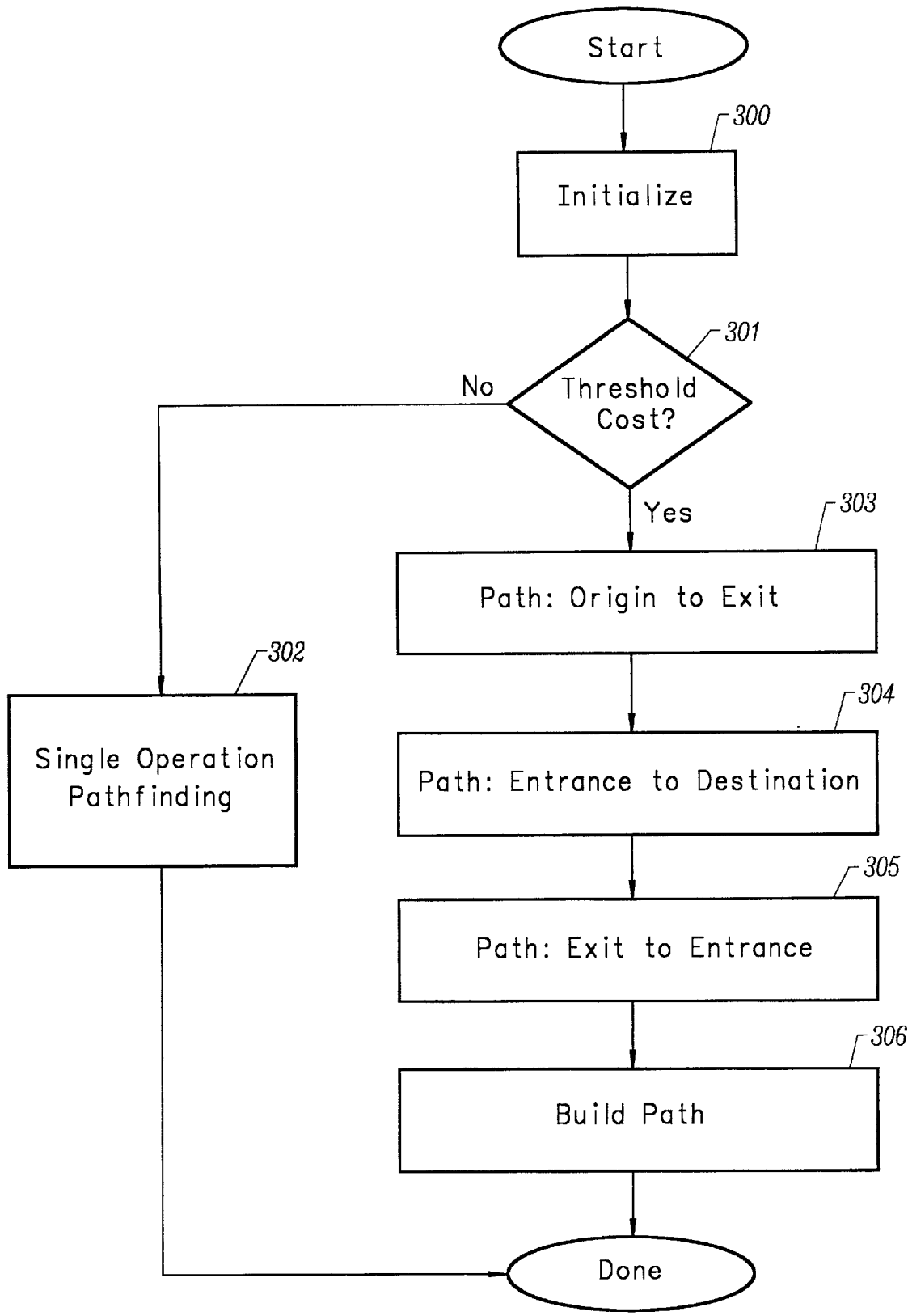
FIG. 5 is a flow chart describing a method for computing a path between an origin and destination in a network that is divided into tiles in accordance with the present invention.

As the distance between an origin node and destination node increases, the number of nodes and links that must be considered in determining a path between the origin and destination can increase greatly. As a result, the system performing pathfinding on the electronic map may need to perform a tremendous number of computations. This may significantly increase the time required for finding a path between the origin and the destination. FIG. 5 illustrates a flow chart for a process that can be employed by a computer system to reduce the computation time required for finding a path between an origin and a destination. The process shown in FIG. 5 may be employed on a network that has been separated into regions that will be called "tiles."

Figure 6:
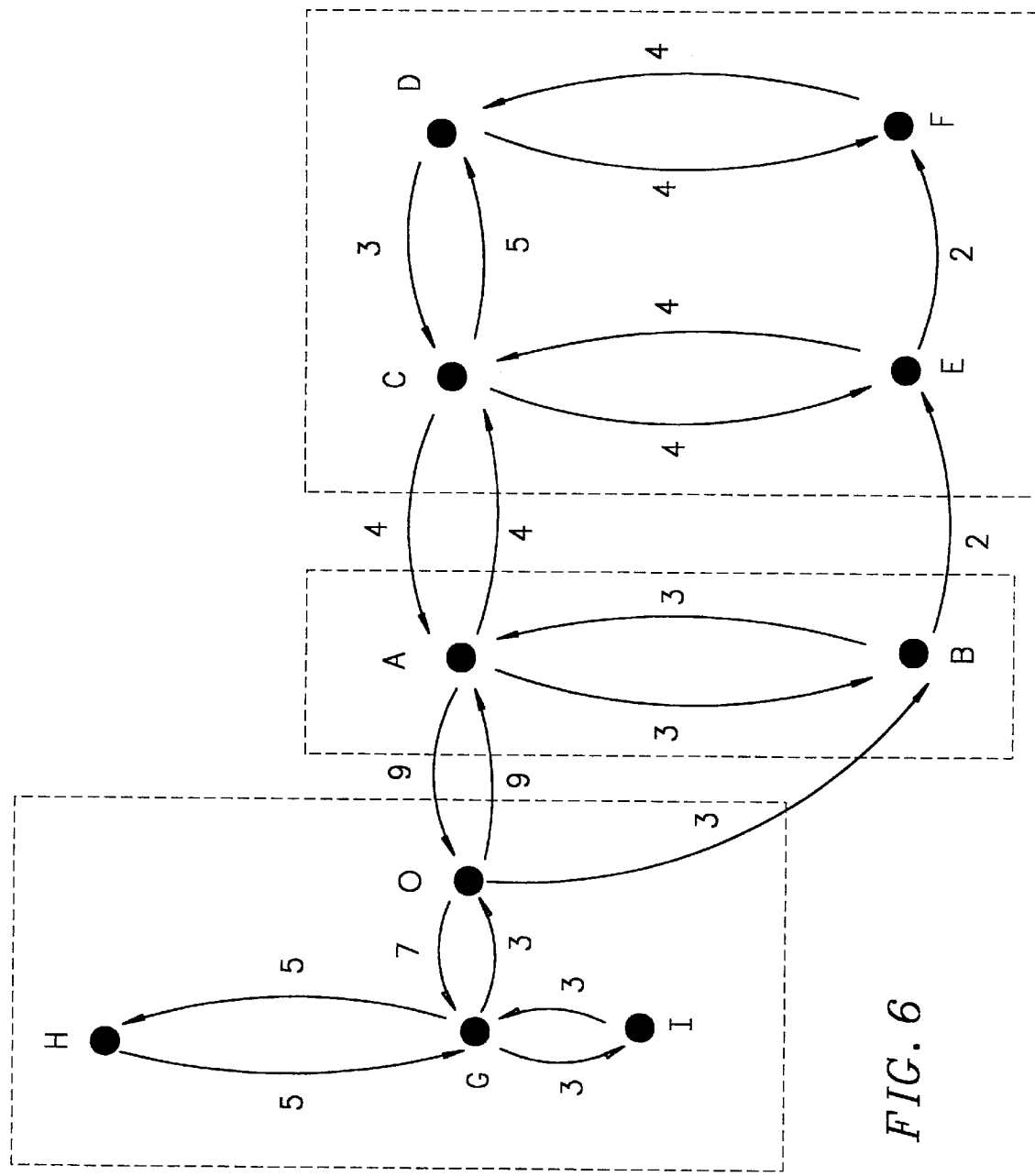
FIG. 6 is an example of how the network in FIG. 3 may be divided into tiles.

FIG. 6 illustrates one way of dividing the directed graph in FIG. 3 into tiles. A first tile consists of nodes H, G, I and O; a second tile consists of nodes A and B, and a third tile consists of nodes C, D, E, and F. The method illustrated in FIG. 5 divides the pathfinding process into several smaller pathfinding operations. The result of each pathfinding operation is then combined to build a path between the origin and the destination. In accordance with the present invention, the total time for executing each of the smaller scale pathfinding operations and combining their results may be less than the time required for executing a single pathfinding operation.

The pathfinding process shown in FIG. 5 is first initialized in step 300. During initialization, an origin node and a destination node in a network are established. These nodes may be established in a variety of ways, including accepting inputs from the user of an electronic map. After initialization, a determination is made in step 301 of whether the cost of reaching the destination node from the origin node will be at least equal to a threshold cost. Alternatively, it may be determined whether a threshold cost exists between the tile containing the origin and the tile containing the destination. If the threshold cost is met, it is likely that the computation of a path connecting the origin to the destination will be completed faster by dividing the computation into several smaller computations. Otherwise, the division of the computation may not save any time.

The type of cost that is measured is determined by the type of network that is being employed. For example, if the network is an electronic map, cost may be measured by driving time or another geographic type of variable.

If the threshold cost is not met, a path may be found between the origin and the destination in step 302 by using the process shown in FIG. 4. If the threshold cost is met, a path is found in step 303 coupling the origin to an exit node associated with the tile containing the origin. In order to find a path between the origin and the exit node, the pathfinding process illustrated in FIG. 4 may be employed, with the exit node being treated as the destination node.

An exit node is a node that is on or near the boundary of the origin's tile. The boundary of a tile is defined by a set of exit boundary nodes and entrance boundary nodes. The exit boundary nodes are all of the nodes in a tile that have an outgoing link extending to a node outside of the tile. The entrance boundary nodes are all of the nodes in a tile that have an incoming link extending from a node outside of the tile. A node may be both an exit boundary node and an entrance boundary node.

Next, a path is found in step 304 between the destination and an entrance node associated with the tile that contains the destination. An entrance node is a node that is on or near the boundary of the destination's tile. In order to find a path between the destination and the entrance node, the pathfinding process illustrated in FIG. 4 may be used, with the entrance node being treated as the origin node.

A path is also found between the exit node and the entrance node in step 305. In order to find the path between the exit node and the entrance node, the process illustrated in FIG. 4 may be employed. Alternatively, a path between the exit node and the entrance node may be retrieved from a table containing a predetermined list of paths between each exit node and each entrance node in the network. This table of paths may be stored on the same processor readable medium as the network or a different processor readable medium. The table of paths may be created using the process illustrated in FIG. 4.

Once the origin to exit node, entrance node to destination, and exit node to entrance node paths have been found, they may be combined in step 306 to obtain a path from the origin to the destination. However, in order to provide for the efficient operation of the process illustrated in FIG. 5, it is important to select suitable exit nodes and entrance nodes for each tile in the network. Additionally, it is useful to be able to effectively select a suitable exit node from a set of exit nodes and a suitable entrance node from a set of entrance nodes for use in the method of FIG. 5. One method for picking exit/entrance nodes from a set is to minimize cost.

Figure 7A:
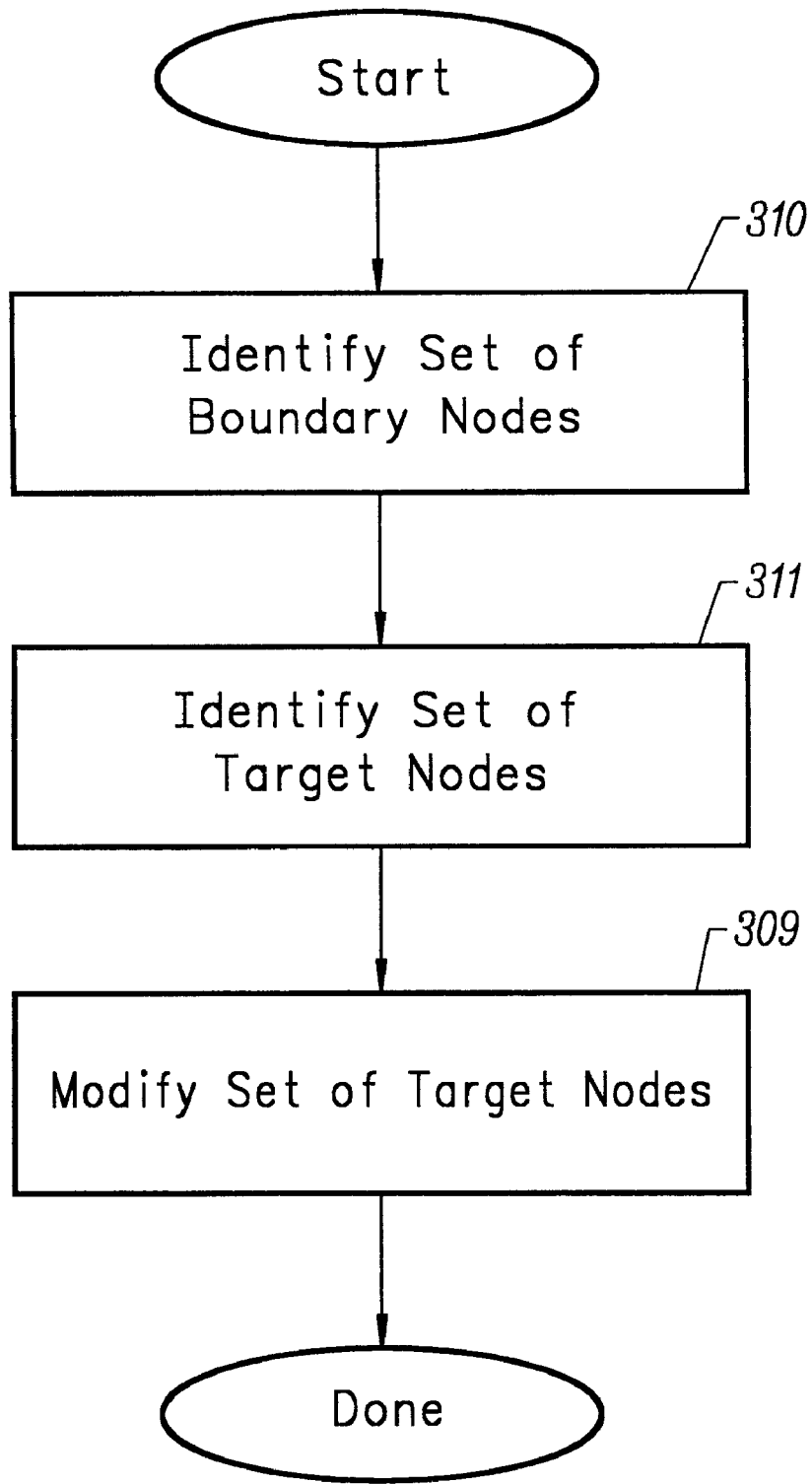
FIG. 7A is a flow chart describing a method for identifying exit and entrance nodes for a tile in a network in accordance with the present invention.

FIG. 7A illustrates a process that may be employed for identifying either a set of exit nodes for a tile or a set of entrance nodes for a tile. To begin the process for finding exit nodes, a set of exit boundary nodes is identified for a tile in step 310. Next, a set of exit target nodes is identified for the tile in step 311. Each exit target node may serve as an exit node.

Additionally, the set of exit target nodes is modified in step 309. The modified set of exit target nodes may provide a better set of exit nodes than the exit target nodes initially identified in step 311. One possible modification to the original set of exit target nodes includes reducing the number of exit target nodes. As a result, the amount of computation time required for finding paths between an origin and a destination may be reduced. Alternatively, the set of exit target nodes may be modified to provide for exit target nodes that are separated from the tile by a smaller cost than the previous exit target nodes. Many other types of modifications may be made to the set of exit target nodes, in accordance with the present invention.

Figure 7B:
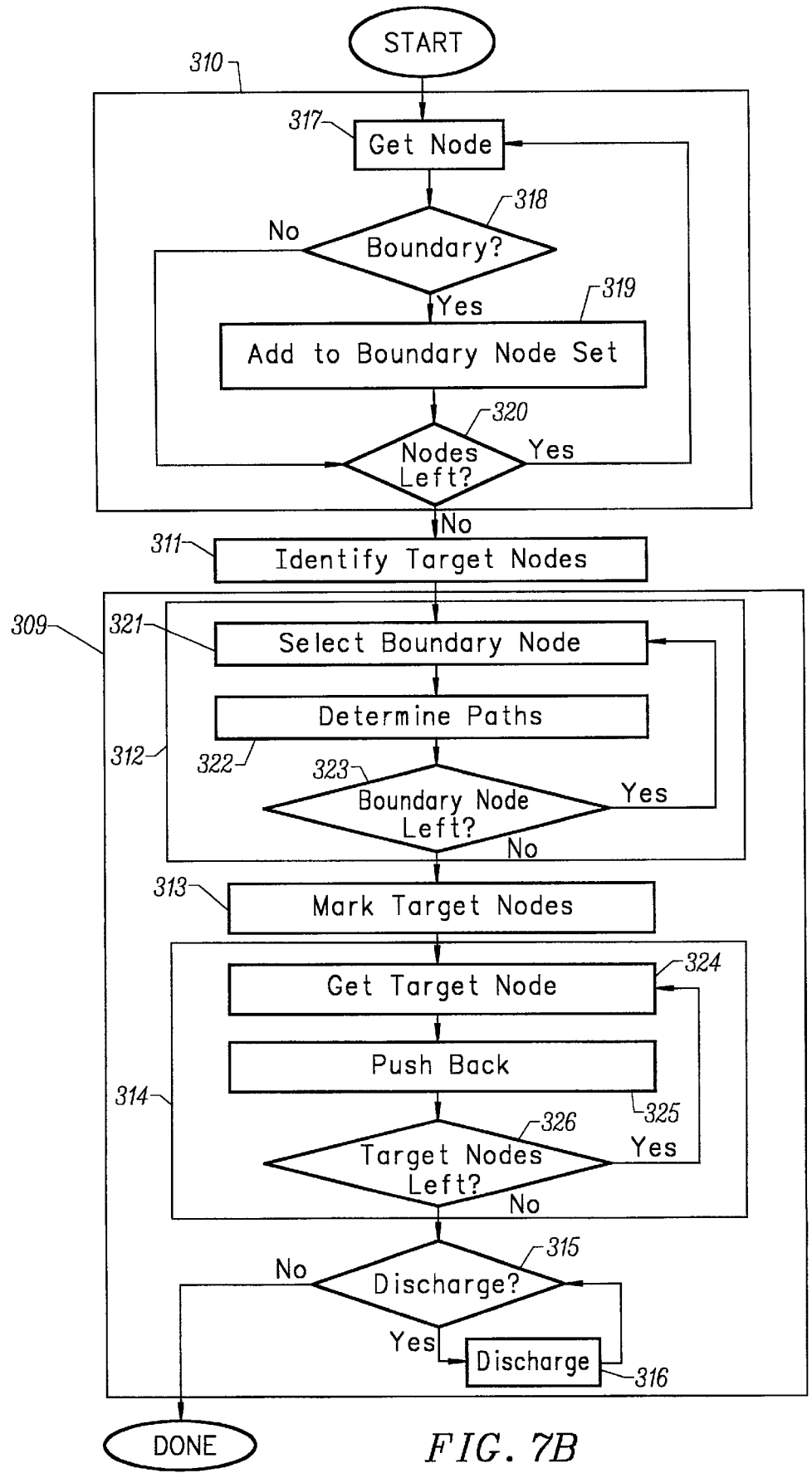
FIG. 7B is a flow chart describing one method for identifying exit and entrance nodes for a tile in a network in accordance with the present invention.

The process depicted in FIG. 7A may be performed by a system, as shown in FIG. 1, executing instructions and operating on data stored in a computer readable medium. FIG. 7B illustrates one embodiment of the method depicted in FIG. 7A, in more detail, for identifying either exit nodes or entrance nodes.

When identifying a set of exit nodes according to the method shown in FIG. 7B, a set of exit boundary nodes is identified for a tile in step 310. The exit boundary nodes may be identified according to the following process. A node in the file is selected in step 317. A determination is made in step 318 of whether the selected node is an exit boundary node. This may be done by determining whether the selected node has a link extending to a node outside the tile. if it is determined that the selected node is not an exit boundary node, then a determination is made in step 320 of whether any nodes in the tile have not been examined. If any unexamined nodes remain, a new node is selected (step 317) and examined (step 318).

If it is determined that the selected node is an exit boundary node, then the node is added to the set of exit boundary nodes in step 319. The set of exit boundary nodes may be maintained in a data structure. After a node is added to the set of exit boundary nodes, a determination is made in step 320, as described above, to determine if any unexamined nodes remain in the tile.

After a set of exit boundary nodes has been identified, a set of exit target nodes is identified for the tile in step 311.

The set of exit target nodes may also be maintained in a data structure. Exit target nodes are those nodes that cannot be reached from the tile without incurring a sufficient cost. In finding entrance nodes, as will be discussed in greater detail below, entrance target nodes are identified. Entrance target nodes are those nodes from which a tile cannot be reached without incurring a sufficient cost. In one embodiment of the invention, sufficient costs are selected so that the sum of the sufficient cost for a set of exit target nodes and the sufficient cost for a set of entrance target nodes is less than or equal to the threshold cost identified above in FIG. 5. As a result, the cost of a path identified using steps 303, 304, 305, and 306 in FIG. 5 from an origin to a destination, which passes through a node in the set of exit target nodes and a node in the set of entrance target nodes, will be at least as low as the cost of a path found between the origin and destination using the process described in FIG. 4 and step 302 of FIG. 5.

In one embodiment of the present invention, a sufficient cost is selected for a set of exit target nodes to be a cost of at least a value C from the origin tile, with C being a predetermined value. If the tile is in an electronic map, the sufficient cost may be measured in an unlimited number of ways including travel time, travel expenses, and roadway preferences. For example, C may be a specified distance, such as 10 miles.

Figure 8A:
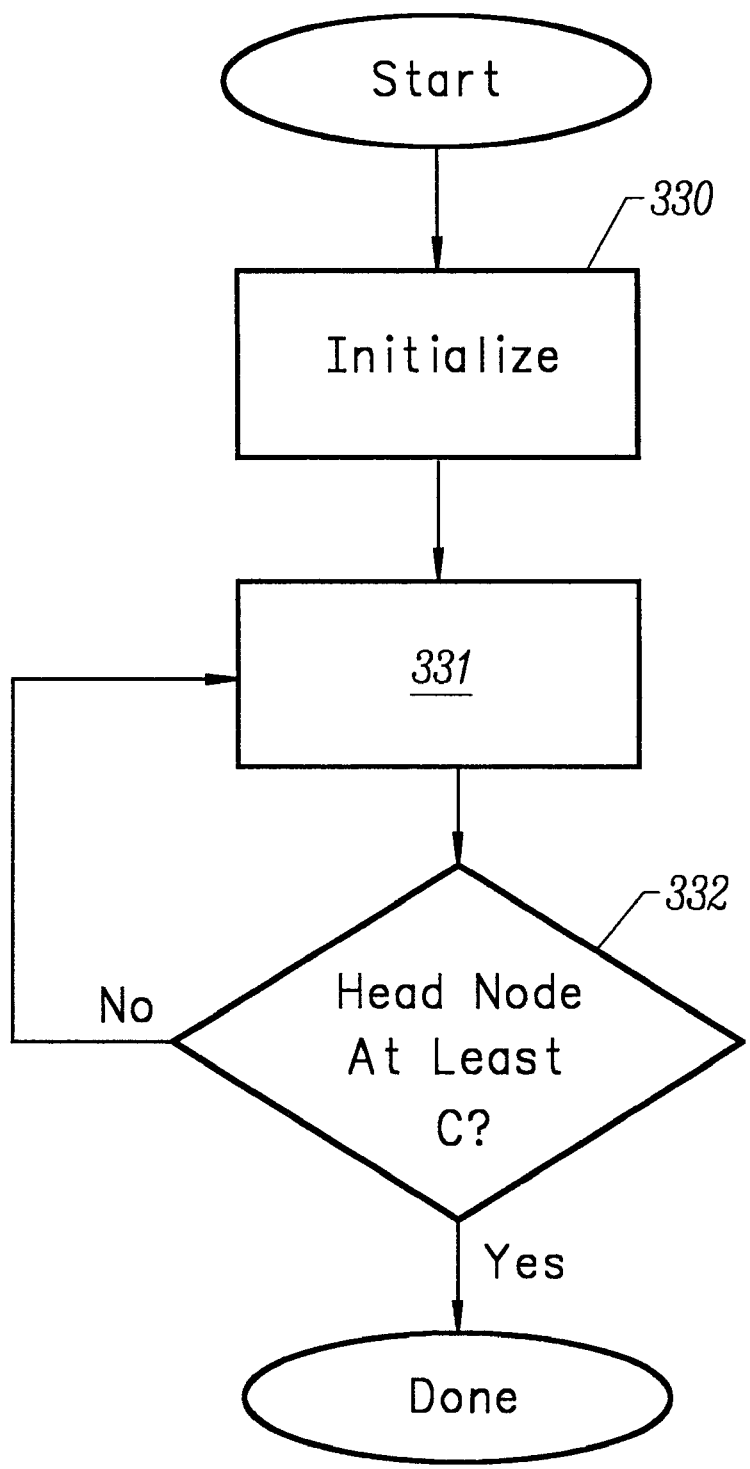
FIG. 8A is a flow chart describing a method for identifying a set of target nodes in one embodiment of the present invention.

FIG. 8A illustrates a flow chart of a process for identifying a set of exit target nodes having a sufficient cost. First, the system initializes an origin priority queue and an origin visited list in step 330, as described above for step 202 in FIG. 4. However, each exit boundary node is treated as an origin in this process, so the origin priority queue is loaded with each exit boundary node identified in step 310, and each boundary node is given a key value of 0.

Figure 8B:
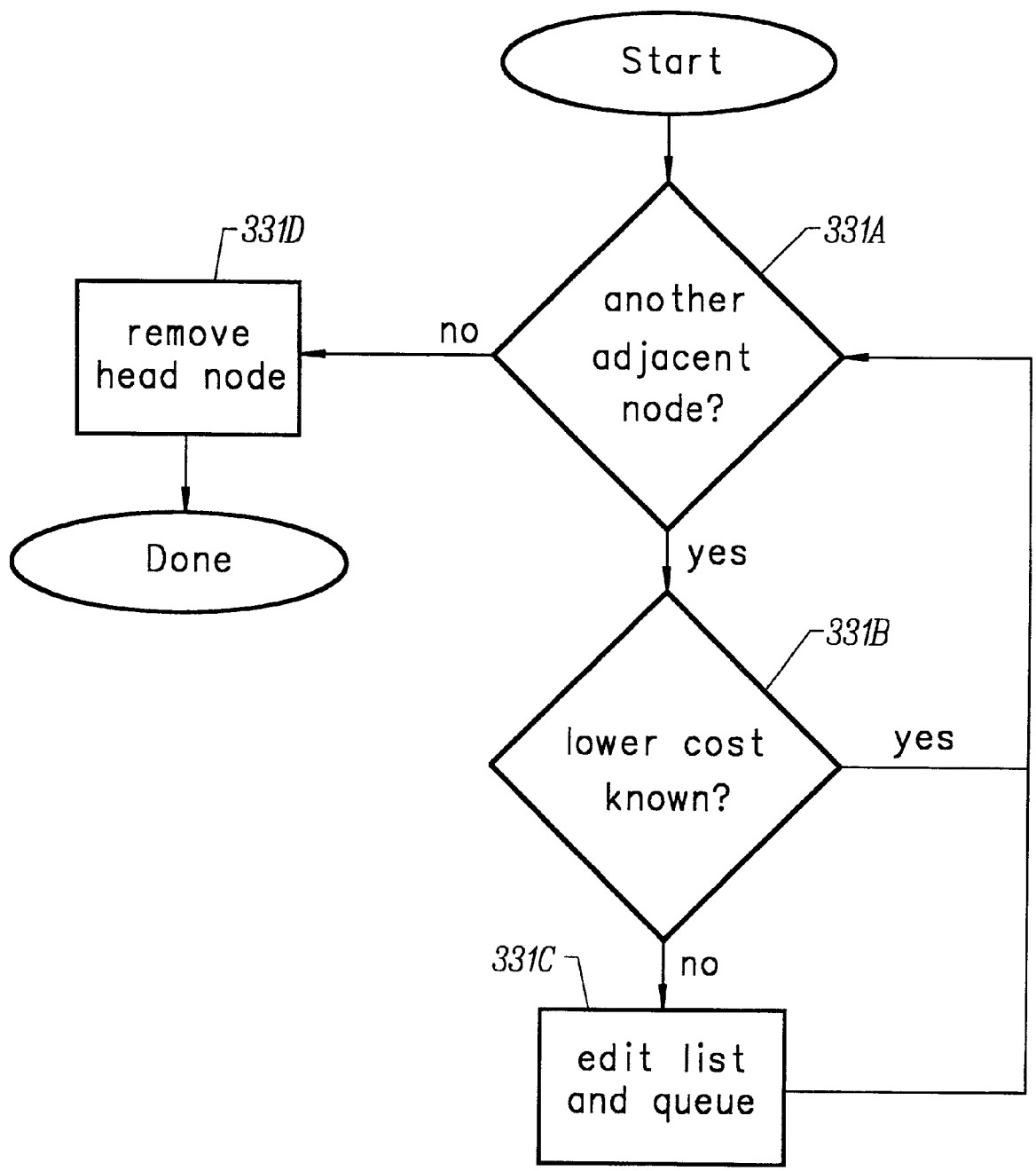
FIG. 8B illustrates one aspect of the method shown in FIG. 8A.

Next, step 331 is performed. An illustration of the process performed in step 331 appears in FIG. 8B. In FIG. 8B, nodes adjacent to the head node in the origin priority queue are identified in step 331A, as described for step 206 in FIG. 4. If there are no adjacent nodes, the head node in the origin priority queue is removed in step 331D, as described for step 212 in FIG. 4, and step 331 is done. If there are adjacent nodes, one of the adjacent nodes is selected in step 331A. For an adjacent node, in step 331B, the system determines whether there is a lower known cost on the visited list or priority queue for traveling between the adjacent node and one of the exit boundary nodes. This is done in the same manner as described for step 208 in FIG. 4. That is, a cost is calculated by adding the head node's key value to the cost of traveling from the head node to the adjacent node, and the calculated cost is then compared with known costs. If a lower cost is found, the system loops to step 331A to determine whether any more adjacent nodes remain. If adjacent nodes do remain, a new one is selected and the cost of its path is evaluated in step 331B.

If no lower cost path is found in step 331B, the adjacent node is added to or updated in the priority queue and visited list in step 331C, as described for step 210 in FIG. 4. After the priority queue and visited list are updated, the system loops back to step 331A to determine if any more adjacent nodes exist. If there is a lower known cost (in step 331B), the system loops back to step 331A.

After step 331, it is determined, in step 332, whether the key value for the node at the head of the origin priority queue is at least the value C, with C being a predetermined cost value. If this condition is not satisfied, step 331 is repeated. If the condition is satisfied in step 332, the nodes listed in the origin visited list having a cost of at least the value C are the set of exit target nodes.

Figure 9:
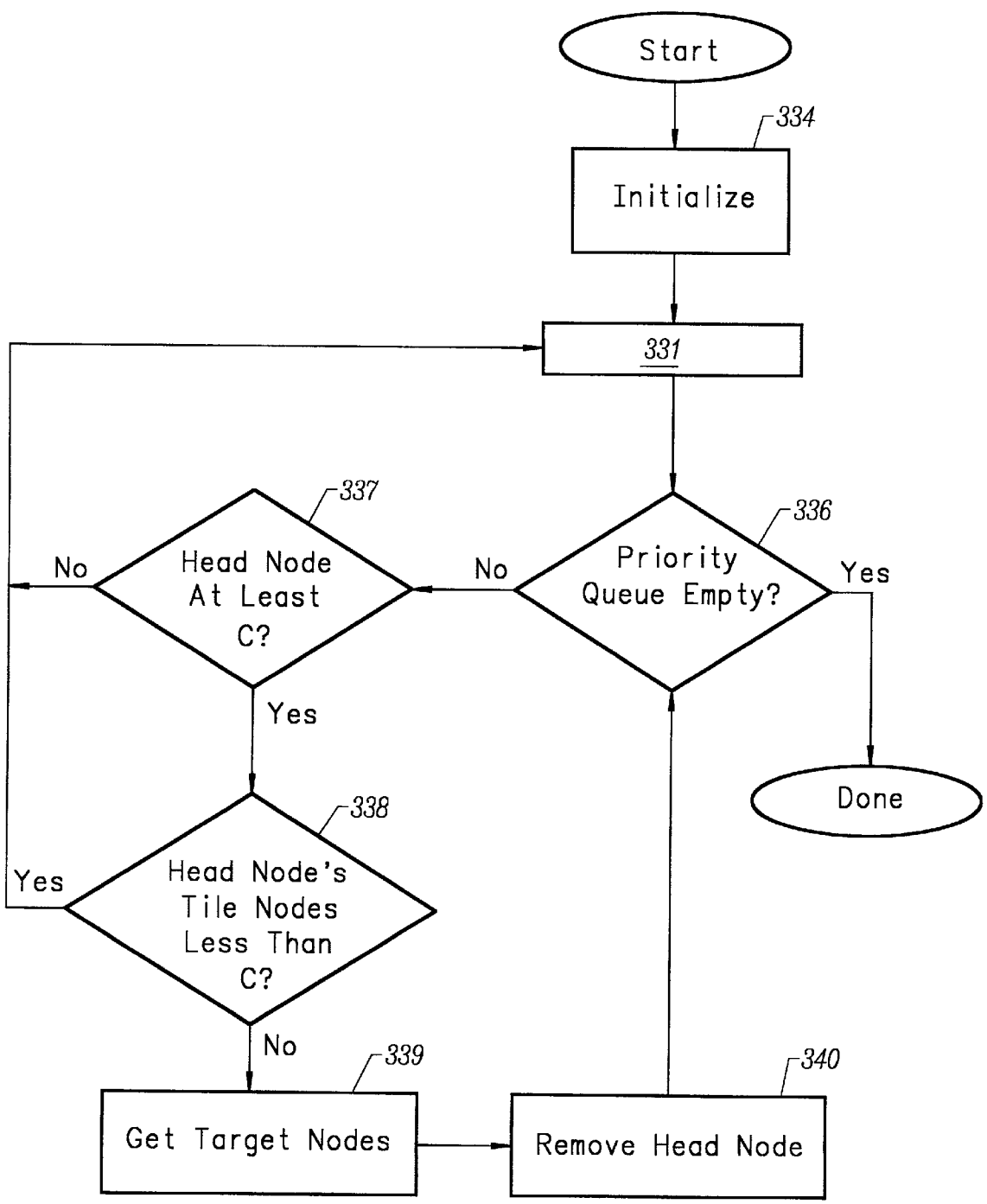
FIG. 9 is a flow chart describing a method for identifying a set of target nodes in an alternate embodiment of the present invention.

In an alternate embodiment of the present invention, a sufficient cost for a set of exit target nodes is selected to mean that the node being evaluated resides in a tile in which no node may be reached from the exit boundary nodes' tile without incurring a predetermined cost of at least a value C. FIG. 9 illustrates a flow chart of a process for identifying a set of exit target nodes for such an alternate sufficient cost. First, the system initializes an origin priority queue and an origin visited list in step 334, as described for step 202 in FIG. 4. However, each exit boundary node is treated as an origin in this process, so the origin priority queue is loaded with each exit boundary node identified in step 310, and each boundary node is given a key value of 0.

Next, the system performs step 331, which is the same as step 331 described above for FIGS. 8A and 8B. After step 331 is performed, the system determines whether the origin priority queue is empty in step 336. If the queue is empty, all of the exit target nodes have been identified. If the priority queue is not empty, it is determined, in step 337, whether the node at the head of the priority queue has a key value of at least the value C. If the key value is less than C, the process in step 331 is repeated.

If the key value is determined to be at least the value C, a determination is made, in step 338, of whether any node in the head node's tile requires a cost of less than C to be incurred to be reached from the exit boundary nodes' tile. If no node in the head node's tile can be reached for a cost of less than C, the head node in the priority queue is added to the set of exit target nodes, in step 339. Otherwise, step 331 is repeated. After the head node is added to the set of exit target nodes, in step 339, the node at the head of the origin priority queue is removed from the origin priority queue, in step 340. Once the head node is removed in step 340, the system loops back to step 336 and determines whether the priority queue is empty.

The set of exit target nodes established in step 311 of FIG. 7A may be used as a set of exit nodes. However, the set of exit target nodes may be modified in step 309, as shown in FIG. 7A, to provide for a better set of exit nodes. In one embodiment of the present invention, as shown in FIG. 7B, the set of exit boundary nodes may be modified by finding an existing path between each exit target node and each exit boundary node (step 312), marking the set of exit target nodes (step 313), and pushing back the set of exit target nodes (step 314). Additionally, it may be decided to further modify the set of exit target nodes by discharging (step 316) one or more of the exit target nodes.

As shown in FIG. 7B, a path from each exit boundary node to each exit target may be determined in step 312. In some cases, it may not be possible to find a path between an exit boundary node and an exit target node, because the network does not contain such a path. In order to begin identifying paths between the exit target nodes and exit boundary nodes, an exit boundary node is selected from the set of exit boundary nodes, in step 321. Next, a path is found from the selected exit boundary node to each exit target node, in step 322.

Figure 10:
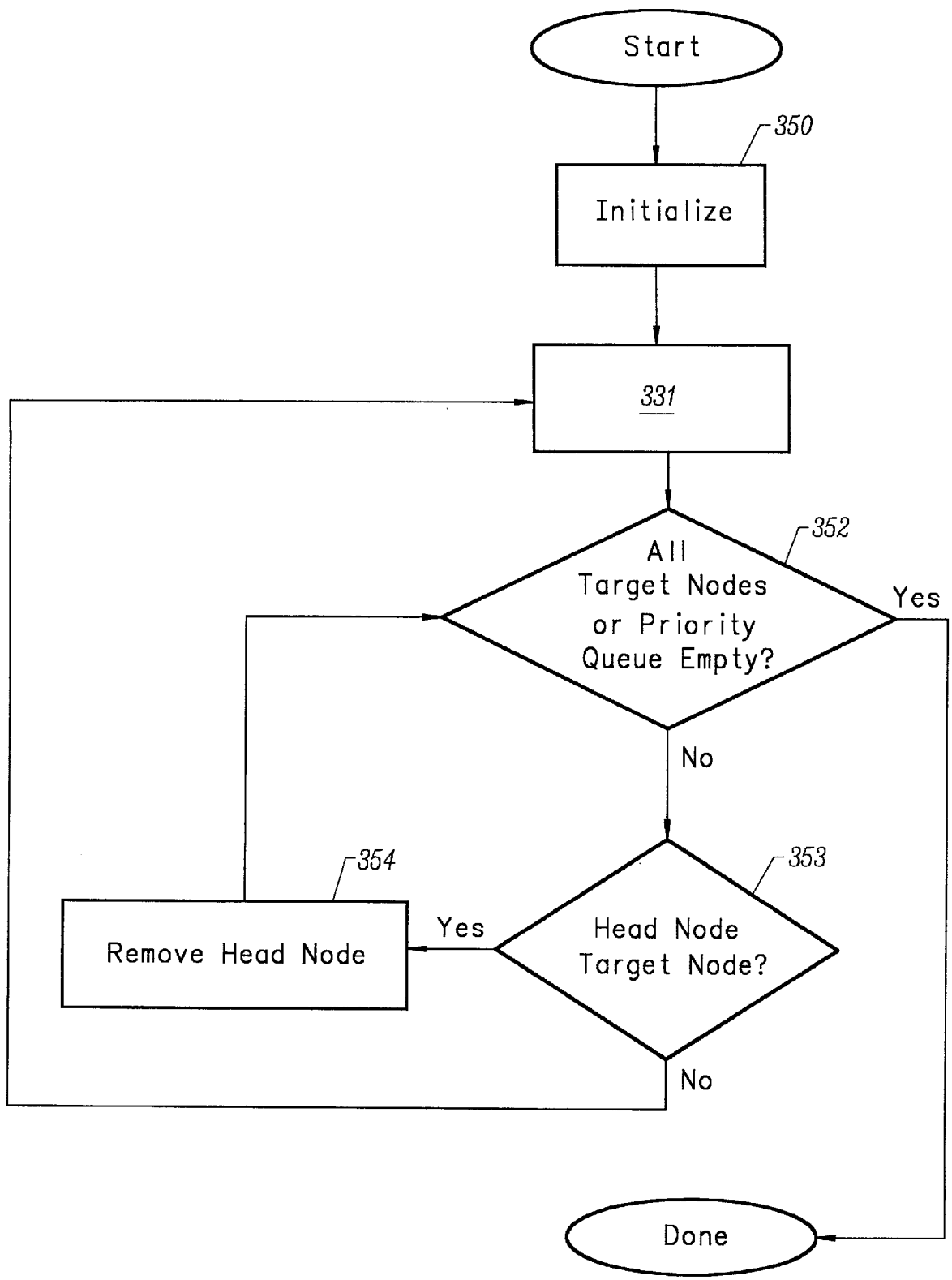
FIG. 10 is a flow chart describing a method for identifying paths between the boundary nodes and target nodes specified in FIG. 7B in one embodiment of the present invention.

FIG. 10 illustrates a process for performing step 322 in one embodiment of the present invention. In this process, the system initializes an origin priority queue and an origin visited list, in step 350, as described for step 202 in FIG. 4. However, in step 350, the origin priority queue is loaded with the exit boundary node selected in step 321, and the exit boundary node is given a key value of 0. After initialization, step 331 is performed, as described above with respect to FIGS. 8A and 8B.

After step 331 is performed, it is determined, in step 352, whether each node in the set of exit target nodes has reached the head of the origin priority queue, and whether the priority queue is empty. If each exit target node has reached the head of the priority queue, or the priority queue is empty, all the existing paths for the selected exit boundary node have been identified, and step 322 is done. If each exit target node has not reached the head of the origin priority queue, and the priority queue is not empty, it is determined, in step 353, whether the node at the head of the origin priority queue is an exit target node. If it is an exit target node, it is removed from the priority queue in step 354, and the system loops back to step 352 to examine the new head node. Otherwise, step 331 is repeated.

Once step 322 is done, a determination is made, in step 323, of whether step 322 has been performed on all of the exit boundary nodes. If any of the exit boundary nodes have not been employed in step 322, then the system loops back to step 321 to select a new exit boundary node. Otherwise, step 312 is done. Once step 312 has been completed, the least cost path from every exit boundary node to every exit target node is known and can be constructed from the data in the origin visited lists.

Figure 11A:
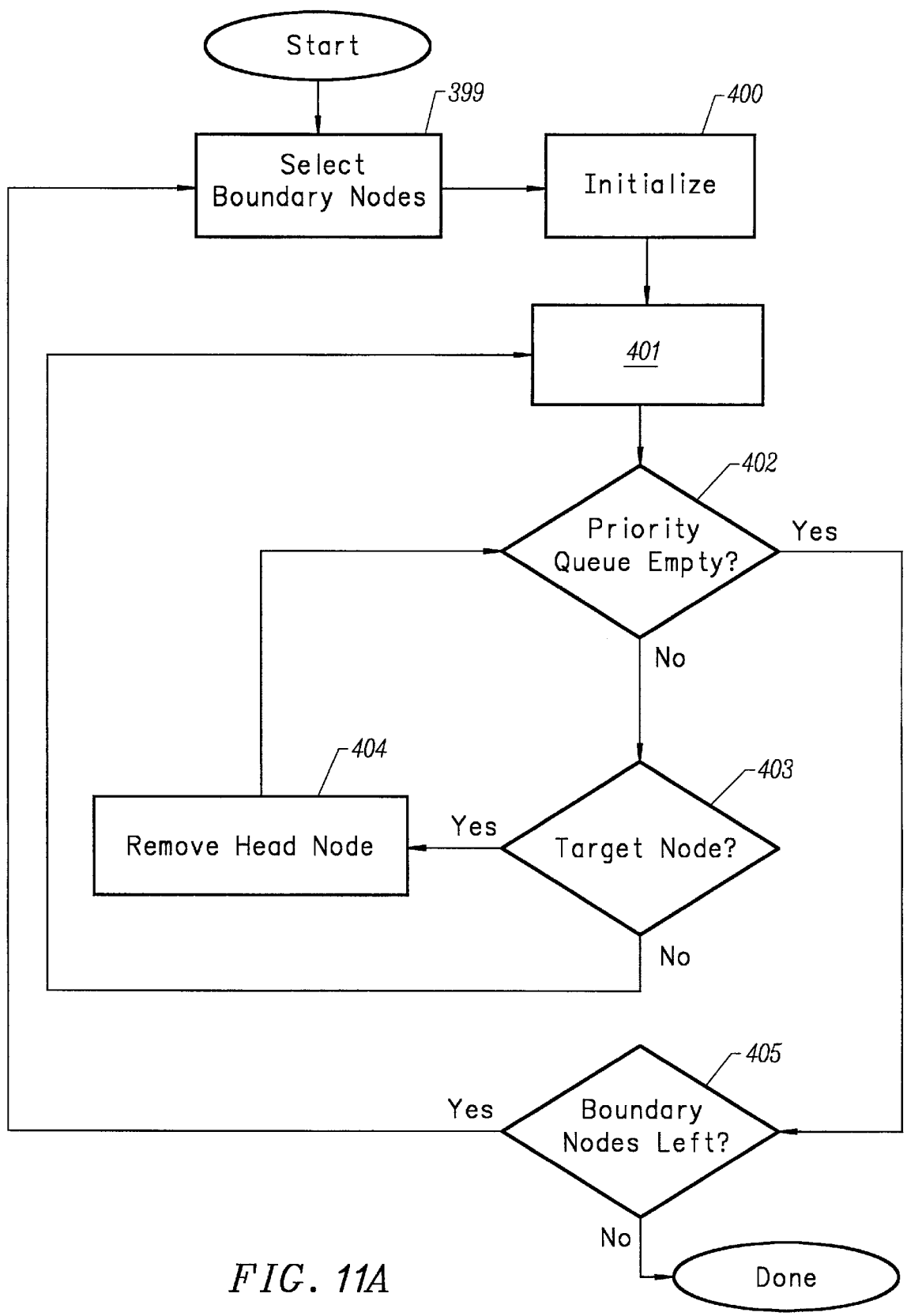
FIG. 11A is a flow chart describing a method for identifying paths between the boundary nodes and target nodes specified in FIG. 7B in an alternate embodiment of the present invention.

In an alternate embodiment of the present invention, the process illustrated in FIG. 11A may be employed to find paths between exit target nodes and exit boundary nodes, in place of the embodiment shown for step 312 in FIGS. 7B and 10. In the method shown in FIG. 11A, paths between multiple exit boundary nodes and exit target nodes may be found at the same time.

Once a set of exit boundary nodes and a set of exit target nodes have been identified, a set of nodes is selected from the set of exit boundary nodes in step 399. The selected set of exit boundary nodes may include one exit boundary node, all of the exit boundary nodes, or any other number of the exit boundary nodes. Next, in step 400, an origin priority queue and visited list are initialized, as described in step 202 in FIG. 4. However, the origin priority queue and visited list are both loaded with all the exit boundary nodes selected in step 399. Each exit boundary node is considered an origin, and is therefore given a key value of 0 in the priority queue.

Additionally, the origin visited list is constructed differently in step 400 than the origin visited list initialized in step 202 of FIG. 4. Like the origin visited list in step 202, the visited list in step 400 has a node field. However, for each node entry, the visited list in step 400 includes a cost entry and previous node entry (PREV) for each exit boundary node selected in step 399. When no path can be identified between a node in the visited list and one of the selected exit boundary nodes, the respective cost and previous node entries may be supplied with a value which indicates that no path is known. The visited list may be initialized to list each of the selected exit boundary nodes.

Figure 11B:
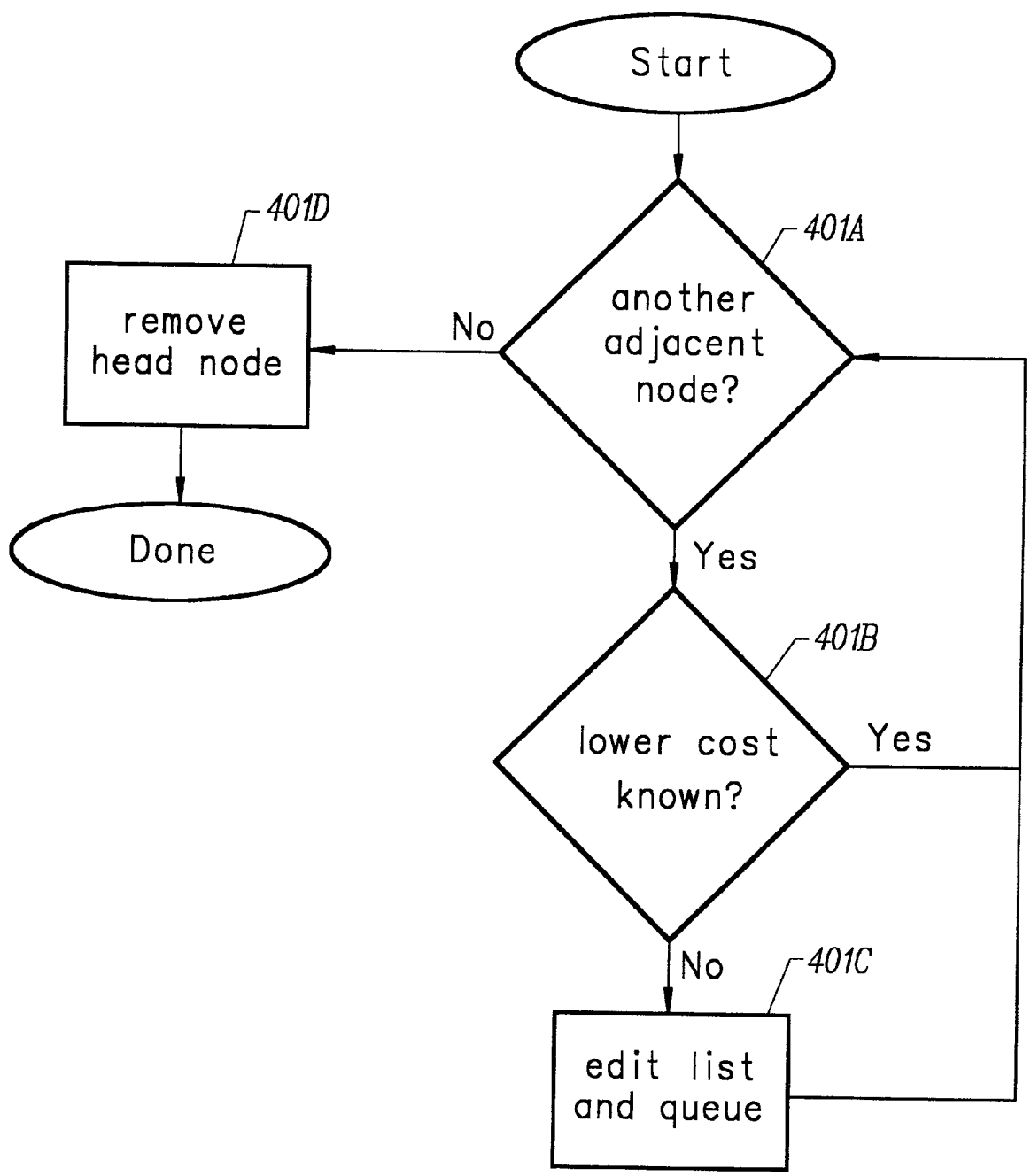
FIG. 11B illustrates one aspect of the method shown in FIG. 11A.

Once the origin priority queue and origin visited list are initialized, a pathfinding routine is commenced in step 401. FIG. 11B illustrates one pathfinding routine that may be performed in step 401. In FIG. 11B, nodes adjacent to the head node in the origin priority queue are identified in step 401A, as described for step 206 in FIG. 4. If there are no adjacent nodes, the head node in the origin priority queue is removed in step 401D, as described for step 212 in FIG. 4, and step 401 is done. If there are adjacent nodes, one of the adjacent nodes is selected in step 401A. For an adjacent node, in step 401B, the system determines whether there is a lower known cost on the visited list or priority queue for traveling between the adjacent node and any of the selected exit boundary nodes. This analysis is performed for each exit boundary node in the same manner that the single origin analysis is performed in step 208 in FIG. 4. If a lower cost path is found for each of the selected exit boundary nodes, the system loops to step 401A to determine whether any more adjacent nodes remain. If adjacent nodes do remain, a new one is selected and the cost of its path is evaluated in step 401B.

If no lower cost path is found between the adjacent node and any of the selected exit boundary nodes in step 401B, the adjacent node is added to or updated in the priority queue and visited list in step 401C. Step 401C operates in the same fashion as step 210 in FIG. 4, with the following modifications. When being added to or updated in the visited list, only the cost and previous node entries associated with the newly found low cost path to an exit boundary node are added. When the adjacent node is added to or updated in the priority queue, it is given a key value according to the following rule: If the adjacent node has never reached the head of the priority queue, then the key value is equal to the lowest cost associated with the adjacent node, else the key value is equal to the lowest cost that has been modified since the last time the adjacent node reached the head of the priority queue. After the priority queue and visited list are updated, the system loops back to step 401A to determine if any more adjacent nodes exist.

Once step 401 is completed, it is determined, in step 402, whether the priority queue is empty. If the priority queue is empty, it is determined in step 405 whether any exit boundary nodes are left to be selected. If there are exit boundary nodes left, the system loops back to step 399 and selects a group of exit boundary nodes. Otherwise, the process is considered complete, since the existing paths between the exit boundary nodes and exit target nodes have all been identified and stored in the visited list.

If the priority queue is not empty, a determination is made in step 403 of whether the node at the head of the priority queue is an exit target node. If the head node is an exit target node, it is removed in step 404, and the system loops back to step 402 to determine if the priority queue is empty. If the head node is not an exit target node, the system loops back to perform step 401.

Figure 11C:
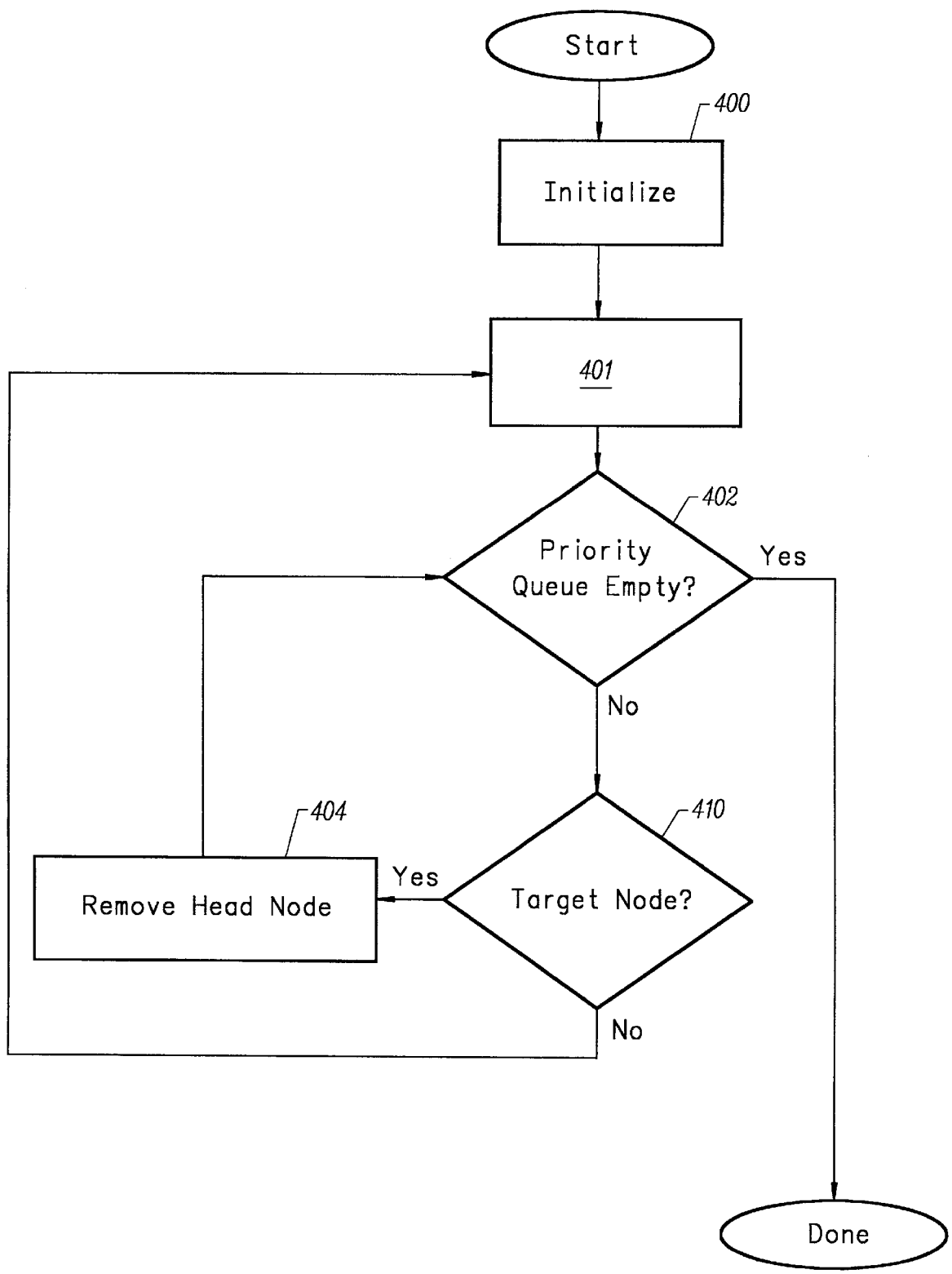
FIG. 11C illustrates an alternate method of identifying target nodes and paths between target nodes and boundary nodes.

In one embodiment of the present invention, the step of identifying the exit target nodes (step 311) and the step of finding paths between exit boundary nodes and exit target nodes (step 312) may be performed simultaneously by performing the process illustrated in FIG. 11C. First, the system initializes an origin priority queue and origin visited list, in step 400, in the same manner as described for step 400 in FIG. 11A. However, the origin priority queue is loaded with all the exit boundary nodes identified in step 310. Each exit boundary node is considered an origin, and is therefore given a key value of 0 in the priority queue.

Next, step 401 is performed in the same manner as described for step 401 in FIG. 11A. After step 401 is performed, a determination is made in step 402 of whether the priority queue is empty. If the priority queue is not empty, a determination is made in step 410 of whether the node at the head of the priority queue qualifies as an exit target node. The head node qualifies as an exit target node, if its cost entry in the origin visited list for each exit boundary node is either a value indicating that no path is known or a value greater than or equal to a predefined cost value, which is considered to be a sufficient cost. If the head node does not qualify as an exit target node, the system loops back to perform step 401. If the head node does qualify as a target node, the head node is removed from the priority queue is step 404. After the head node is removed, the system loops back and performs step 402 to determine if the priority queue is empty.

If the priority queue is empty, the process is completed. The set of exit target nodes has been completely identified and the data in the origin visited list provides paths from the exit boundary nodes to the exit target nodes. The set of exit target nodes consists of the nodes listed in the visited list that qualified as target nodes in step 410.

Once the paths between the exit boundary nodes and the exit target nodes are determined, the exit target nodes are marked with the exit boundary nodes, in step 313. Marking an exit target node consists of associating the exit target node with a set of exit boundary nodes. For example, a data structure may be constructed in a processor readable medium to have a list of exit target nodes and a set of boundary nodes associated with each exit target node.

In one embodiment of the present invention, each exit target node is marked with all of the exit boundary nodes identified in step 310. In an alternate embodiment of the present invention, each exit target node is marked with a more limited set of exit boundary nodes. The more limited set of exit boundary nodes includes only each exit boundary node that has no other exit boundary nodes residing in a path identified in step 312 between itself and the exit target node.

Once the exit target nodes have been marked, it is possible to push back each of the exit target nodes with respect to the boundary nodes. Pushing back provides for the replacement of existing nodes in the set of exit target nodes with nodes that have a smaller cost displacement between themselves and the exit boundary nodes' tile. Additionally, pushing back may reduce the number of nodes in the set of exit target nodes, thereby providing for a more limited set of possible exit nodes. As a result, pathfinding computation time may be reduced.

One process for pushing back the exit target nodes is presented in step 314 of FIG. 7B. Once the marking is completed in step 313, an exit target node is retrieved in step 324 to be pushed back. The selected exit target node is pushed back in step 325. After the node has been pushed back, it is determined, in step 326, whether any nodes in the set of target nodes have not been pushed back. If all the exit target nodes have been pushed back, then the push back process is completed. Otherwise, the system loops back to step 324 to select another exit target node.

Figure 12:
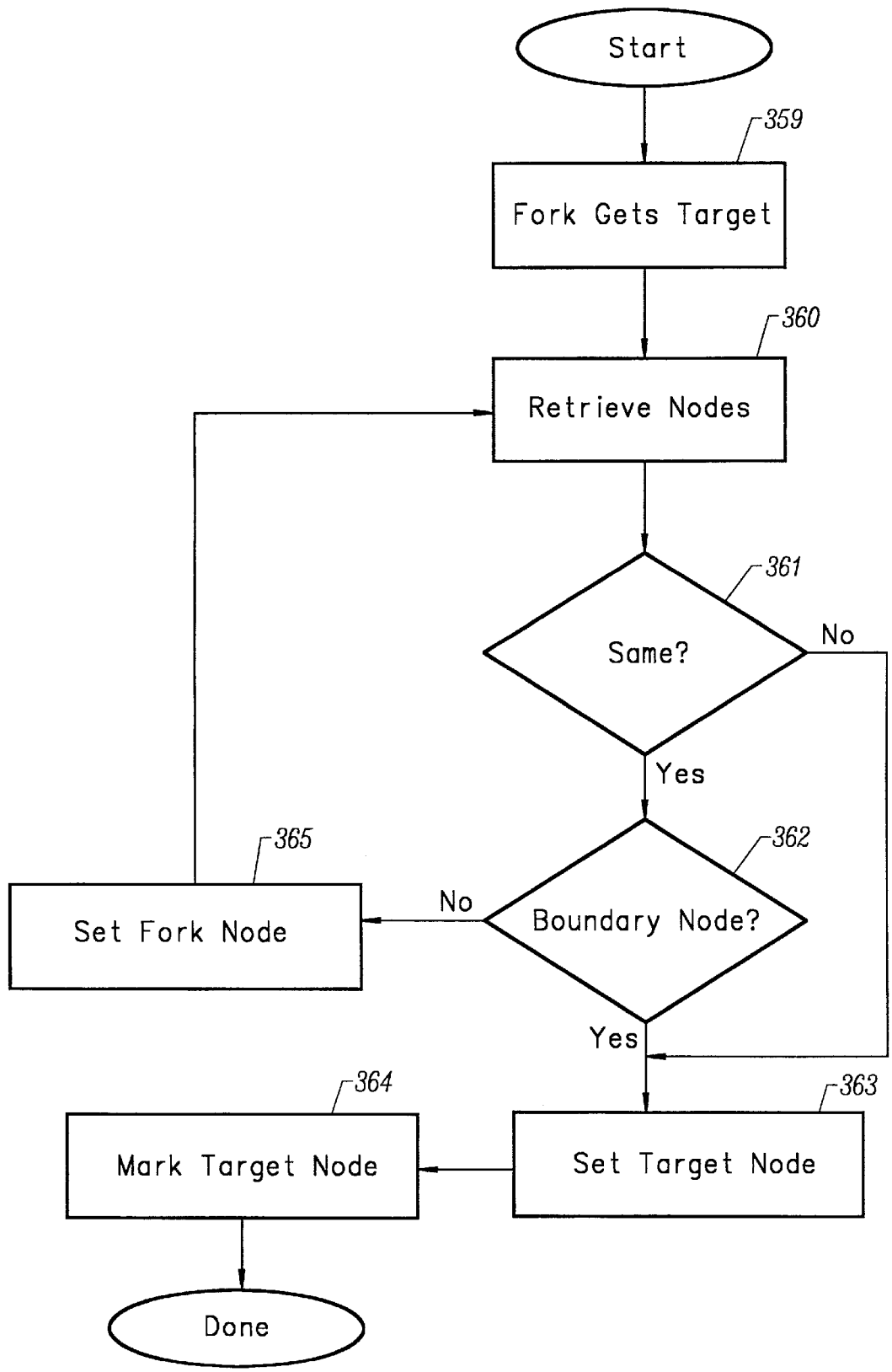
FIG. 12 is a flow chart describing a method for pushing back a node in accordance with the present invention.
Figure 13:
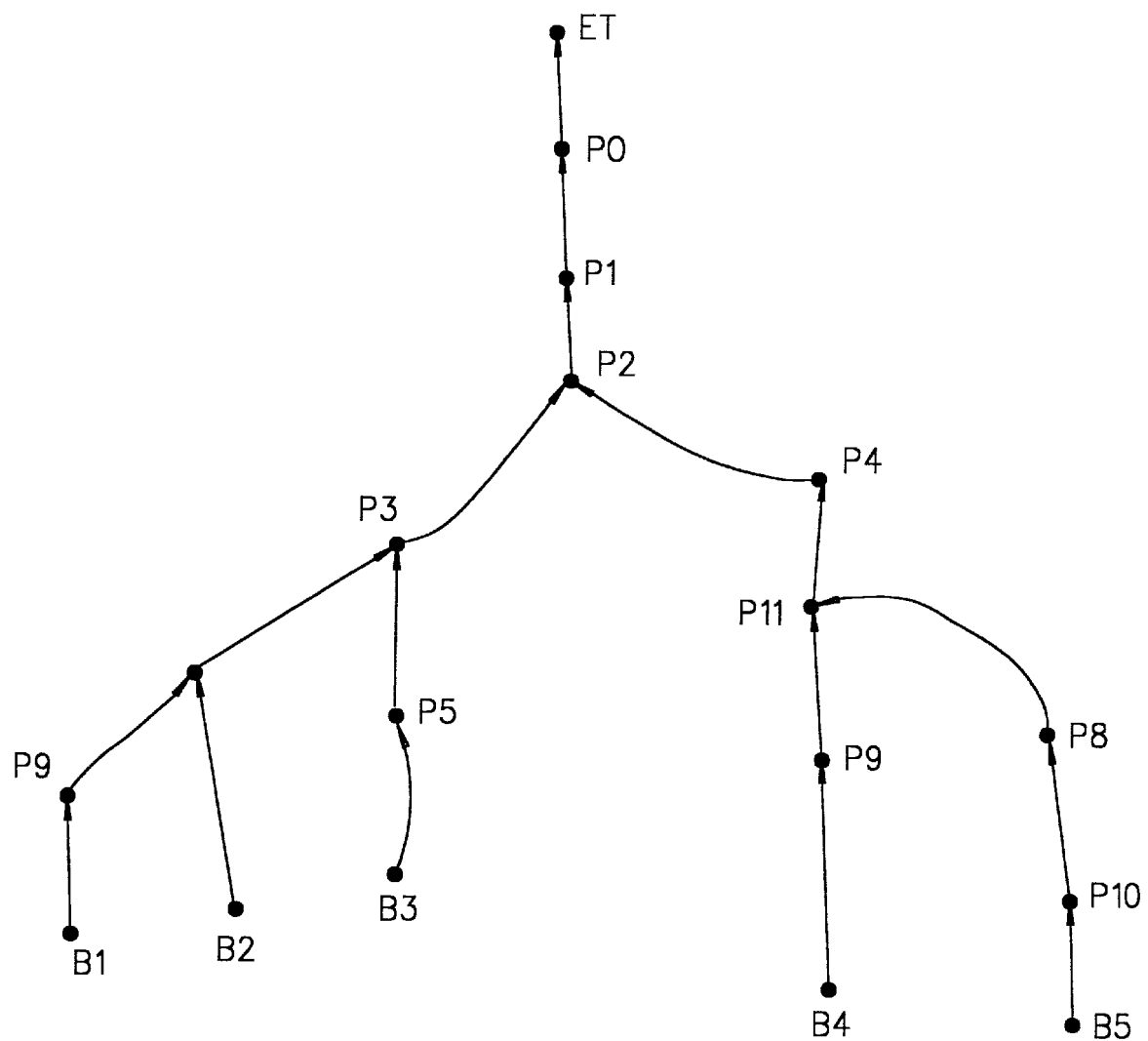
FIG. 13 illustrates a set of nodes and links associated with a target node.

FIG. 12 illustrates a process for pushing back an exit target node, which may be employed in step 325. FIGS. 13 illustrates an example of an exit target node (ET) being marked with a series of exit boundary nodes B1, B2, B3, B4, and B5. FIG. 13 also includes a number of paths, which were determined from the origin visited list produced in step 312.

Once an exit target node has been selected (step 324), the system defines a fork node variable, which is initialized to be the selected exit target node in step 359. The node closest to the fork node in each of the paths identified in step 312, which extend between the exit target node and the exit boundary nodes marking the exit target node, is identified in step 360. The nodes that are identified in step 360 may be retrieved from the origin visited lists created in step 312. In the case of FIG. 13, node ET is set to be the fork node in step 359, and node P0 is selected in step 360, since it is the closest node to the fork node in each path extending from one of the boundary nodes B1–B5 to the fork node.

After the nodes closest to the fork node have been identified, a determination is made in step 361 of whether each of the nodes selected in step 360 are the same. If they are the same, then it is determined whether the node selected in step 360 is a boundary node (step 362). If the nodes identified in step 360 are not the same, or the nodes are the same and that node is determined to be an exit boundary node in step 362, then the fork node is added to the set of exit target nodes and the exit target node selected in step 324 is deleted from the set of exit target nodes (step 363). After the fork node is added, it is marked, in step 364, with the set of exit boundary nodes that marked the deleted exit target node. If the nodes are determined to not be the same in step 361, when the fork node variable is set to be the exit target node, then the set of exit target nodes will not be modified.

If the nodes selected in step 360 are the same and that node is not an exit boundary node, then the fork node is set to be the node identified in step 360 (step 365). In FIG. 13, the fork node is set to be the node P0 in step 365. After the fork node is set in step 365, the system loops back to step 360 to identify the nodes closest to the fork node again. In FIG. 13, node P1 will be identified in step 360. After completely pushing back the exit target node (ET) illustrated in FIG. 13, the exit target node (ET) is deleted from the set of exit target nodes, and node P2 is identified as a fork node and added to the set of exit target nodes and marked with exit boundary nodes B1, B2, B3, B4, and B5

In an alternate embodiment of the present invention, pushing back may be more limited. For example, pushing back may be selected to cease after a single node is eliminated from the paths between an exit target node and a set of exit boundary nodes. In such a case, the exit target node (ET) shown in FIG. 13, would be replaced in the set of exit target nodes by node P1 instead of node P2. FIG. 12 only serves as a single example of how pushing back may be performed.

After the exit target nodes have been pushed back in step 314, the resulting set of exit target nodes may be smaller than the original set of exit target nodes. The reduced set of exit target nodes may be employed as a set of exit nodes for the tile.

Further modifications to the set of exit target nodes may be achieved by discharging. Discharging modifies the set of exit target nodes so that the average cost displacement between an exit target node and the exit boundary nodes' tile is reduced. As shown in FIG. 7B, once pushing back the exit target nodes is completed (step 314), a determination is made in step 315 of whether or not to discharge an exit target node. If it is decided to not discharge any exit target nodes, then the modification (step 309) to the set of exit target nodes is completed, and the set of exit target nodes may be employed as exit nodes.

Figure 14:
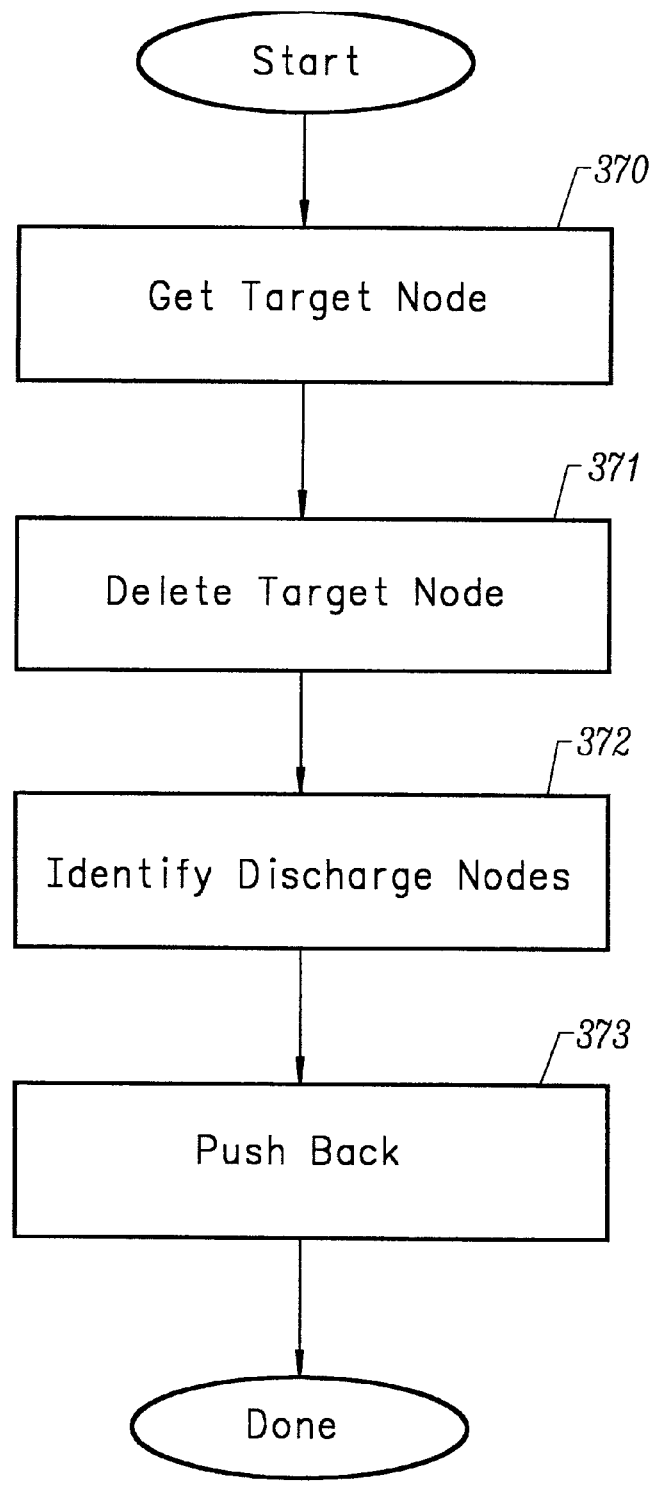
FIG. 14 is a flow chart describing a method for discharging a target node.

However, if a determination is made in step 315 to discharge an exit target node, discharging is performed in step 316. FIG. 14 illustrates only one process for discharging an exit target node in step 316. First, an exit target node, which has links from at least two different nodes in the paths found in step 312, is identified, in step 370. Next, the identified exit target node is deleted from the set of exit target nodes in step 371. After the exit target node is deleted, a set of discharge nodes is identified in step 372. The discharge nodes consist of each of the nodes that are linked to the deleted exit target node in a path identified in step 312. Each discharge node is then pushed back in step 373.

Figure 15:
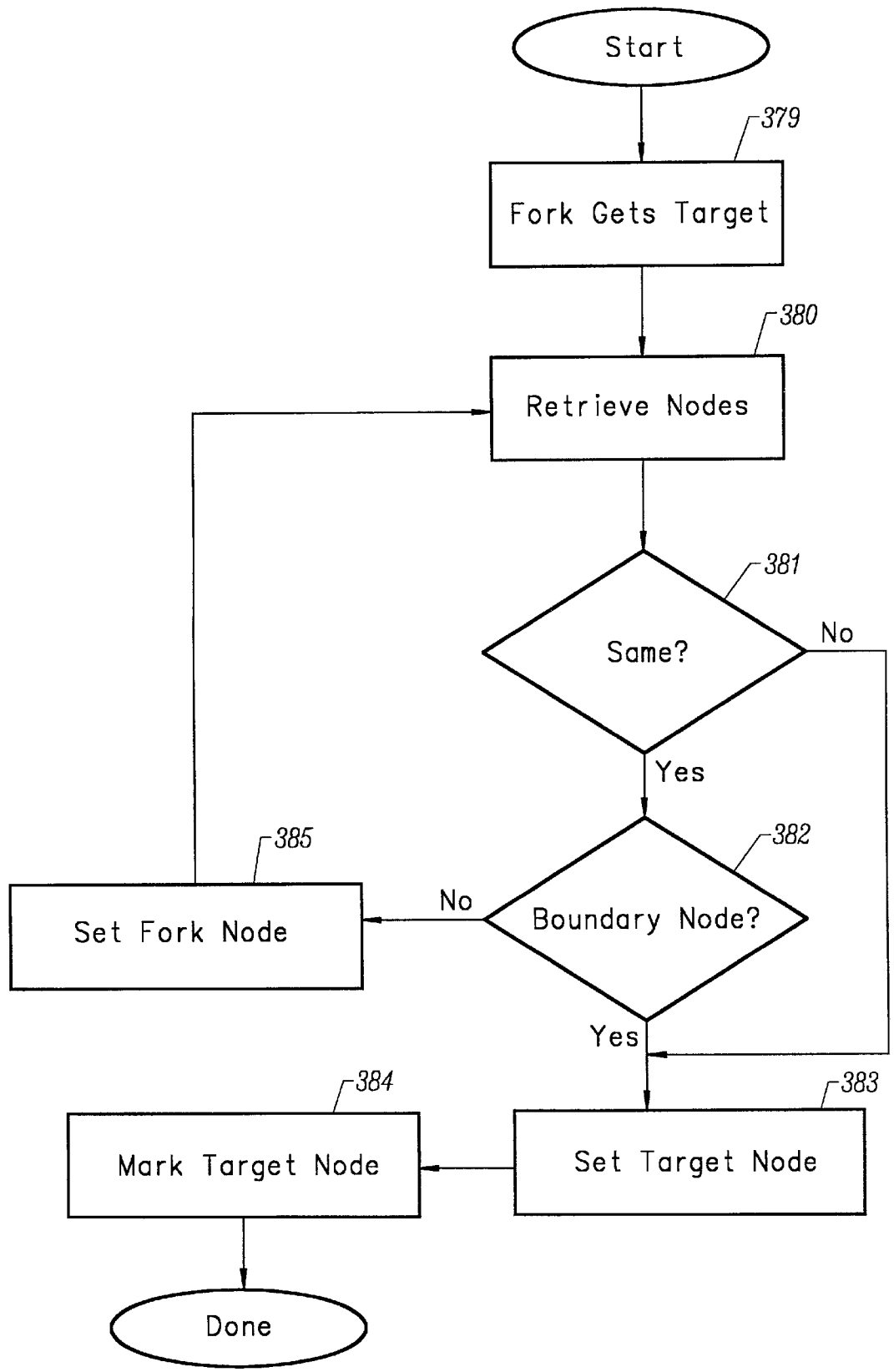
FIG. 15 is a flow chart describing a push back process for use in discharging a target node.

In pushing back each of the discharge nodes, the pushing back process illustrated in FIG. 15 may be employed. The fork node is initialized in step 379 to be one of the discharge nodes. Each node closest to the fork node in all paths identified in step 312, which extend between the fork node and an exit boundary node marking the deleted exit target node, are identified in step 380. In step 381, it is determined whether these nodes are the same. If they are the same, a determination is made in step 382 of whether any one of the nodes identified in step 380 is a boundary node. If the nodes identified in step 380 are either not the same or one of them is a boundary node, then in step 383 the fork node is added to the set of exit target nodes, if it is not already a member. The fork node is then marked in step 384 with the exit boundary nodes that marked the deleted exit target node and may be reached by the fork node from a path identified in step 312. If the fork node was already a member of the set of exit target nodes and fully marked, then no marking is performed.

If the nodes identified in step 380 are the same and none of them are exit boundary nodes, then in step 385 the fork node is set to be the node identified in step 380. The system then loops back to step 380 and continues the above-described operation. Once each discharge node has been pushed back in step 373, a determination may be made in step 315 of whether or not to discharge another exit target node.

If a discharge is performed on node P2 in FIG. 13, after it was added to the set of exit target nodes through pushing back, the following will result. Node P2 will be deleted from the set of exit target nodes. Nodes P3 and P4 will be identified as discharge nodes and pushed back. As a result, node P3 will be added to the set of exit target nodes and marked with exit boundary nodes B1, B2, and B3. Node P4 will not be added to the set of exit target nodes. Node P11 will be added to the set of exit target nodes and marked with exit boundary nodes B4 and B5.

Many different conditions or combinations of conditions may be selected for determining whether or not to perform discharging. In one embodiment of the present invention, discharging is continually performed, unless performing a discharge on an exit target node would increase the total number of exit target nodes. A conditional discharge may be called a complete free discharge if it is performed without resulting in an increase in the total number of exit target nodes.

Figure 16:
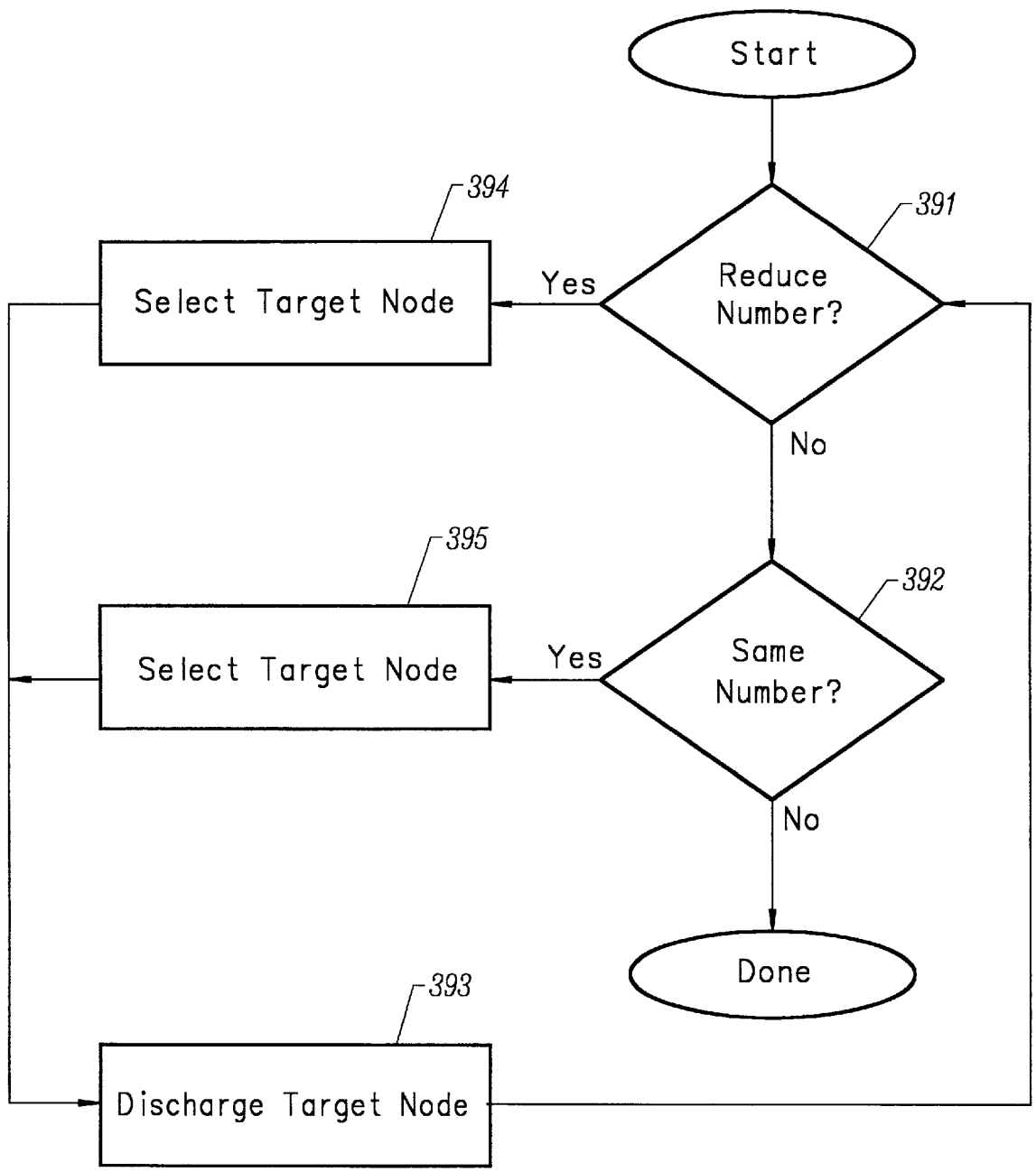
FIG. 16 is a flow chart describing a method of performing a complete free discharge.

FIG. 16 illustrates one method of performing a complete free discharge. First, it is determined in step 391 whether any one of the exit target nodes can be discharged such that the total number of exit target nodes may be reduced. If a reduction is possible, one of the exit target nodes that makes a reduction possible is selected in step 394. Next, the node selected in step 394 is discharged in step 393.

If a reduction is not possible, a determination is made in step 392 of whether one of the exit target nodes can be discharged such that the total number of exit target nodes is not changed. If the total number of exit target nodes may be kept the same, one of the exit target nodes that allows such a result is selected in step 395. Next, the node selected in step 395 is discharged in step 393. After step 393, the system loops back to perform step 391. If it is determined in step 392 that it is not possible to keep the number of exit target nodes the same, then the complete free discharge is done.

In an alternate embodiment of the present invention, discharging may be performed on exit target nodes, until no exit target node is separated by more than a predetermined cost from the tile. In such an embodiment, the exit target node being separated by the greatest cost from the tile may always be selected to be discharged first.

In yet another embodiment of the present invention, a discharge score may be calculated for a selected exit target node. A discharge score is equal to the total cost of traveling between the selected exit target node and its associated tile minus the cost of traveling between the tile and each exit target node that will be newly created from discharging the selected exit target node. Accordingly, the discharge score represents the total cost that will be eliminated from the set of exit target nodes by discharging the selected exit target node. In such an embodiment of the present invention, discharging may be performed until no exit node has a discharge score greater than a predetermined value. In performing discharging, the exit node with the greatest discharge score may always be selected to be discharged first.

A complete free discharge may be followed by a single discharge based on a condition, such as displacement cost or discharge score. After the single discharge has been performed, another complete free discharge may be performed to take advantage of any changes in the set of exit target nodes that may have been caused by the single discharge. This process may be continually repeated, until the condition for triggering the single discharge is no longer present.

A set of entrance nodes may also be identified for a tile by employing the process illustrated in FIGS. 7A and 7B with only a few minor modifications to the process described for identifying exit nodes. The process depicted in FIGS. 7A and 7B may be performed by a system, as shown in FIG. 1, executing instructions and operating on data stored in a computer readable medium. In one embodiment of the present invention, entrance nodes may be identified for tiles in an electronic map.

In step 310, a set of entrance boundary nodes are identified for the tile in the same manner that the exit boundary nodes were identified. Throughout the process of identifying entrance nodes, entrance boundary nodes will be used in place of exit boundary nodes.

In step 311, a set of entrance target nodes are identified. Entrance target nodes are those nodes from which the tile cannot be reached without incurring a sufficient cost. Throughout the process of identifying entrance nodes, entrance target nodes will be used in place of exit target nodes. In one embodiment of the present invention, a sufficient cost is selected to be a cost of at least C from the tile. The method illustrated in FIGS. 8A and 8B may be employed to obtain such a set of entrance target nodes. However, a destination priority queue and destination visited list are substituted for the use of an origin priority queue and origin visited list.

In an alternate embodiment of the present invention, a sufficient cost may be selected to mean that a node resides in a tile having no node from which a path may be formed to the entrance boundary nodes' tile for a cost of less than C. The process illustrated in FIG. 9 may be employed to obtain such a set of entrance target nodes. However, a destination priority queue and destination visited list are substituted for the use of an origin priority queue and origin visited list. Additionally, in step 338, the determination made is whether a path from any node in the head node's tile to the entrance boundary nodes' tile can be constructed for a cost of less than C. After completing step 311, the set of entrance target nodes may be employed as a set of entrance nodes.

In step 312, paths are found from the entrance target nodes to the entrance boundary nodes. This may be done by performing the process described in FIG. 10. However, a destination priority queue and destination visited list are substituted for the use of an origin priority queue and origin visited list, and each of the entrance boundary nodes acts as a destination in the pathfinding process. Alternatively, such a set of paths may be identified by performing the process that is illustrated in FIGS. 11A, 11B, and 11C. Once again, destination priority queues and destination visited lists are used, and the exit boundary nodes act as destinations in the pathfinding process.

When marking entrance target nodes, in step 313, each entrance target node is market with a corresponding set of entrance boundary nodes, as described above for the exit target nodes. When pushing back entrance target nodes, in step 314, each entrance target node may be pushed back, in the manner illustrated in FIGS. 12 and 13. In the case of an entrance target node, the links between the nodes illustrated in FIG. 13 are merely reversed to extend toward the boundary nodes, and entrance boundary nodes are employed instead of exit boundary node. After completing pushing back, the set of entrance target nodes may be employed as a set of entrance nodes.

In step 315, it may be determined whether discharging is to be performed for an entrance target node. If it is desirable to perform discharging, it maybe performed in step 316 in the same manner as described above for exit target nodes. However, entrance boundary nodes are employed instead of exit boundary nodes and the network links extend towards the entrance boundary nodes and away from the entrance target nodes.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for constructing a set of nodes to be employed in paths extending between nodes in a processor readable representation of a network and nodes in a first region in the processor readable representation of a network, wherein the set of nodes is also in the processor readable representation of the network, said method comprising the steps of:
   (a) identifying a set of boundary nodes in the first region; and
   (b) identifying a set of target nodes in the processor readable representation of the network in response to at least one boundary node in said set of boundary nodes, wherein each node in said set of target nodes is separated by a sufficient cost from the first region.

2. A method as called for in claim 1, wherein said set of boundary nodes includes all boundary nodes in said first region.

3. A method as called for in claim 1, wherein each node in said set of target nodes may not be reached by a path from the first region without incurring a cost of at least C, wherein C is a predetermined value.

4. A method as called for in claim 3, wherein said step (b) includes the steps of:
   setting up an origin priority queue and an origin visited list, said origin priority queue stores node identifications and keys, said origin visited list stores node identifications and costs of traveling from an origin node;
   initializing said origin priority queue to include a node in said set of boundary nodes;
   finding a set of nodes adjacent to said node in said set of boundary nodes;
   determining a cost of traveling to each of said adjacent nodes from said node in s aid set of boundary nodes;
   inserting said adjacent nodes into said origin priority queue, sorted by cost;
   inserting said adjacent nodes into said origin visited list;
   removing said node from said set of boundary nodes from said origin priority queue;
   finding a set of nodes adjacent to a node at said origin priority queue's head;
   determining a cost of traveling to each of said nodes adjacent to said node at said origin priority queue's head;
   inserting into said origin priority queue at least a subset of said nodes adjacent to said node at said origin priority queue's head;
   inserting into said origin visited list, if not already in said origin visited list with a lower cost, said nodes adjacent to said node at said origin priority queue's head; and
   removing from said origin priority queue said node at said origin priority queue's head.

5. A method as called for in claim 4, wherein a node in said set of target nodes is identified when a predetermined condition is met.

6. A method as called for in claim 5, wherein said predetermined condition is a node at said origin priority queue's head having a key that is greater than or equal to a predetermined value.

7. A method as called for in claim 1, wherein the first region may not be reached by a path from any node in said set of target nodes without incurring a cost of at least C, wherein C is a predetermined value.

8. A method as called for in claim 7, wherein said step (b) includes the steps of:
   setting up a destination priority queue and a destination visited list, said destination priority queue stores node identifications and keys, said destination visited list stores node identifications and costs of traveling to a destination node;
   initializing said destination priority queue to include a node in said set of boundary nodes;
   finding a set of nodes adjacent to said node in said set of boundary nodes;
   determining a cost of traveling from each of said adjacent nodes to said node in said set of boundary nodes;
   inserting said adjacent nodes into said destination priority queue, sorted by cost;
   inserting said adjacent nodes into said destination visited list;
   removing said node from said set of boundary nodes from said destination priority queue;
   finding a set of nodes adjacent to a node at said destination priority queue's head;
   determining a cost of traveling from each of said nodes adjacent to said node at said destination priority queue's head;
   inserting into said destination priority queue at least a subset of said nodes adjacent to said node at said destination priority queue's head;
   inserting into said destination visited list, if not already in said destination visited list with a lower cost, said nodes adjacent to said node at said destination priority queue's head; and removing from said destination priority queue said node at said destination priority queue's head.

9. A method as called for in claim 8, wherein a node in said set of target nodes is identified when a predetermined condition is met.

10. A method as called for in claim 9, wherein said predetermined condition is a node at said origin priority queue's head having a key that is greater than or equal to a predetermined value.

11. A method as called for in claim 1, wherein each node in said set of target nodes resides in a tile having only nodes that may not be reached by a path from the first region without incurring a cost of at least C, wherein C is a predetermined value.

12. A method as called for in claim 11, wherein said step (b) includes the steps of:

setting up an origin priority queue and an origin visited list, said origin priority queue stores node identifications and keys, said origin visited list stores node identifications and costs of traveling from an origin node;

initializing said origin priority queue to include a node in said set of boundary nodes;

finding a set of nodes adjacent to said node in said set of boundary nodes;

determining a cost of traveling to each of said adjacent nodes from said node in said set of boundary nodes;

inserting said adjacent nodes into said origin priority queue, sorted by cost;

inserting said adjacent nodes into said origin visited list;

removing said node from said set of boundary nodes from said origin priority queue;

finding a set of nodes adjacent to a node at said origin priority queue's head;

determining a cost of traveling to each of said nodes adjacent to said node at said origin priority queue's head;

inserting into said origin priority queue at least a subset of said nodes adjacent to said node at said origin priority queue's head;

inserting into said origin visited list, if not already in said origin visited list with a lower cost, said nodes adjacent to said node at said origin priority queue's head; and removing from said origin priority queue said node at said origin priority queue's head.

13. A method as called for in claim 12, wherein a node in said set of target nodes is identified when a predetermined condition is met.

14. A method as called for in claim 13, wherein said predetermined condition is a node at said destination priority queue's head having a key that is greater than or equal to a predetermined value and no node in a tile containing said node at said origin priority queue's head may be reached from the first tile for less than a predetermined cost value.

15. A method as called for in claim 1, wherein the first region may not be reached by a path from any node in a tile containing a node in said set of target nodes for a cost of less than C, wherein C is a predetermined value.

16. A method as called for in claim 15, wherein said step (b) includes the steps of:

setting up a destination priority queue and a destination visited list, said destination priority queue stores node identifications and keys, said destination visited list stores node identifications and costs of traveling to a destination node;

initializing said destination priority queue to include a node in said set of boundary nodes;

finding a set of nodes adjacent to said node in said set of boundary nodes;

determining a cost of traveling from each of said adjacent nodes to said node in said set of boundary nodes;

inserting said adjacent nodes into said destination priority queue, sorted by cost;

inserting said adjacent nodes into said destination visited list;

removing said node from said set of boundary nodes from said destination priority queue;

finding a set of nodes adjacent to a node at said destination priority queue's head;

determining a cost of traveling from each of said nodes adjacent to said node at said destination priority queue's head;

inserting into said destination priority queue at least a subset of said nodes adjacent to said node at said destination priority queue's head;

inserting into said destination visited list, if not already in said destination visited list with a lower cost, said nodes adjacent to said node at said destination priority queue's head; and removing from said destination priority queue said node at said destination priority queue's head.

17. A method as called for in claim 16, wherein a node in said set of target nodes is identified when a predetermined condition is met.

18. A method as called for in claim 17, wherein said predetermined condition is a node at said destination priority queue's head having a key that is greater than or equal to a predetermined value and the first region not being able to be reached from any node in a region containing said node at said origin priority queue's head for a cost of less than a predetermined cost value.

19. A method as called for in claim 1, further including the step of:

(c) modifying said set of target nodes, after said step (b) is completed, to obtain said set of nodes to be employed in paths extending between nodes in the processor readable representation of the network and in the first region.

20. A method as called for in claim 19, wherein said step (c) includes the steps of:

removing a first node in said set of target nodes; and adding a second node to said set of target nodes, said second node having a smaller separation from the first region than said first node.

21. A method as called for in claim 19, wherein said step (c) includes the step of:

determining a path between a node in said set of boundary nodes and a node in said set of target nodes.

22. A method as called for in claim 19, wherein said step (c) includes the steps of:

setting up a priority queue and a visited list, said priority queue stores node identifications and keys, said visited list stores node identifications and costs of traveling from a node;

initializing said priority queue to include a node in said set of boundary nodes;

finding a set of nodes adjacent to said node in said set of boundary nodes;

determining a cost of traveling from each of said adjacent nodes to said node in said set of boundary nodes;

inserting said adjacent nodes into said priority queue, sorted by cost;

inserting said adjacent nodes into said visited list;

removing said node from said set of boundary nodes from said priority queue;

finding a set of nodes adjacent to a node at said priority queue's head;

determining a cost of traveling from each of said nodes adjacent to said node at said priority queue's head;

inserting into said priority queue at least a subset of said nodes adjacent to said node at said priority queue's head;

inserting into said visited list, if not already in said visited list with a lower cost, said nodes adjacent to said node at said priority queue's head; and removing from said priority queue said node at said priority queue's head.

23. A method as called for in claim 19, wherein said step (c) includes the steps of:

setting up a priority queue and a visited list, said priority queue stores node identifications and keys, said visited list stores node identifications, and a plurality of costs for a respective one of said node identifications;

initializing said priority queue to include a plurality of nodes in said set of boundary nodes;

finding a set of nodes adjacent to one of said plurality of nodes in said set of boundary nodes;

determining a cost of traveling from each of said adjacent nodes to one of said plurality of nodes in said set of boundary nodes;

inserting said adjacent nodes into said priority queue, sorted by one of said plurality of costs;

inserting said adjacent nodes into said visited list;

removing one of said plurality of nodes from said set of boundary nodes from said priority queue;

finding a set of nodes adjacent to a node at said priority queue's head;

determining a cost of traveling from each of said nodes adjacent to said node at said priority queue's head;

inserting into said priority queue at least a subset of said nodes adjacent to said node at said priority queue's head;

inserting into said visited list, if not already in said visited list with a lower cost, said nodes adjacent to said node at said priority queue's head; and removing from said priority queue said node at said priority queue's head.

24. A method as called for in claim 23, wherein said step (c) is completed when a predetermined condition is met.

25. A method as called for in claim 24, wherein said predetermined condition is met when said priority queue is empty.

26. A method as called for in claim 19, wherein said step (c) includes the steps of:

determining a path between a node in said set of boundary nodes and a node in said set of target nodes;

marking a node in said set of target nodes with a set of nodes in said set of boundary nodes;

pushing back a node in said set of target nodes to identify a fork node;

marking said fork node with a set of nodes in said set of boundary nodes that also mark said node being pushed back;

adding said fork node to said set of target nodes; and deleting said node being pushed back from said set of target nodes.

27. A method as called for in claim 26, wherein said set of nodes in said set of boundary nodes called for in said step of marking a node includes all nodes in said set of boundary nodes.

28. A method as called for in claim 26, wherein each node in said set of nodes in said set of boundary nodes called for in said step of marking a node is a first boundary node that is reached in traversing a path from a node in said set of target nodes to the first region.

29. A method as called for in claim 26, wherein said fork node is immediately coupled to at least two nodes having paths coupled to a node in said set of nodes in said set of boundary nodes called for in said step of marking a node.

30. A method as called for in claim 26, wherein said fork node is immediately coupled to only one node having a path coupled to a node in said set of nodes in said set of boundary nodes called for in said step of marking a node.

31. A method as called for in claim 26, wherein said step of pushing back includes the steps of:

identifying a first node in a path extending between said node to be pushed back and the first region, wherein said first node is a node closest to said node being pushed back and having links to a plurality of nodes each being coupled by a path to a node in said set of nodes in said set of boundary nodes called for in said step of marking a node; and selecting said first node as said fork node.

32. A method as called for in claim 26, wherein said step (c) includes the step of:

discharging a node in said set of target nodes to reduce an average cost displacement between nodes in said set of target nodes and said first region.

33. A method as called for in claim 32, wherein said step of discharging is performed repeatedly until performing said step of discharging would result in the number of nodes in said set of target nodes being increased.

34. A method as called for in claim 32, wherein said step of discharging includes the steps of:

selecting a node in said set of target nodes having links to a plurality of nodes each being in a path coupled to a boundary node;

pushing back a node in said plurality of nodes to obtain a fork node;

adding said fork node to said set of target nodes, if said fork node is not already in said set of target nodes; and deleting said node being discharged from said set of target nodes.

35. A method as called for in claim 34, wherein said step of discharging further includes the step of:

marking said fork node with a set of boundary nodes, after said fork node is added to said set of target nodes.

36. A method as called for in claim 32, further including the steps of:

(1) performing said step of discharging repeatedly until performing said step of discharging would result in the number of nodes in said set of target nodes being increased;

(2) after performing said step (1), determining if a condition exists;

(3) if said condition is determined to exist in said step (2), discharging a node in said set of target nodes;

(4) after performing said step (3), performing said steps (1)–(3).

37. A method as called for in claim 36, wherein said condition is a cost of traveling between the first tile and any one of said nodes in said set of target nodes exceeding a predefined value, and wherein said node discharged in said step (1) is a node in said set of target nodes that is separated from the first tile by a greatest cost.

38. A method a s called for in claim 36, wherein said condition is any node in said set of target nodes having a discharge score exceeding a predetermined value, and wherein said node discharged in said step (3) is a node in said set of target nodes having a largest discharge score.

39. A computer implemented method for constructing a set of nodes to be used in pathfinding, wherein the set of nodes is associated with a first region in a processor readable representation of a network, which is stored on a processor readable medium, and wherein the set of nodes is also in the processor readable representation of the network, said method comprising the steps of:

(a) identifying a set of boundary nodes in the first region;

(b) identifying a set of target nodes, wherein each node in said set of target nodes is separated by a sufficient cost from the first region;

(c) determining a path between a node in said set of boundary nodes and a node in said set of target nodes;

(d) marking a node in said set of target nodes with a set of nodes in said set of boundary nodes;

(e) pushing back a node in said set of target nodes to identify a fork node;

(f) marking said fork node with a set of nodes in said set of boundary nodes that also mark said node being pushed back in said step (e);

(g) adding said fork node to said set of target nodes; and (h) deleting said node being pushed back in step (e) from said set of target nodes.

40. A method as called for in claim 39, further including the step of:

(i) discharging a node in said set of target nodes to reduce an average cost displacement between nodes in said set of target nodes and said first region.

41. A computer implemented method of identifying a path between an origin node in a first region and a destination node in a second region, wherein the origin node and the destination node are located on a processor readable representation of a network stored on a computer readable medium, wherein said method includes:

(a) identifying a first node, wherein said step of identifying the first node includes the steps of:

identifying a first set of boundary nodes in the first region, and identifying a first set of target nodes in the processor readable representation of the network in response to at least one boundary node in said first set of boundary nodes, wherein each node in said first set of target nodes is separated by a sufficient cost from the first region:

(b) identifying a second node, wherein said step of identifying the second node includes the steps of:

identifying a second set of boundary nodes in the second region, and identifying a second set of target nodes in the processor readable representation of the network in response to at least one of the boundary nodes in said second set of boundary nodes, wherein each node in said second set of target nodes is separated by a sufficient cost from the second region:

(c) commencing pathfinding to determine a path between said origin node and said first node;

(d) commencing pathfinding to determine a path between said destination node and said second node; and (e) commencing pathfinding to determine a path between said first node and said second node.

42. A method as called for in claim 41, wherein said step (e) includes the steps of:

accessing a list of predetermined paths; and selecting a path between said first node and said second node.

43. A processor readable storage medium having processor readable program code embodied on said processor readable storage medium, said processor readable program code for constructing a set of nodes to be employed in paths extending between nodes in a processor readable representation of a network and nodes in a first tile in the processor readable representation of the network, wherein the set of nodes is also in the processor readable representation of the network, said processor readable program code including:

a first program code, said first program code instructing a processor to identify a set of boundary nodes in the first tile; and a second program code, said second program code instructing a processor to identify a set of target nodes in the processor readable representation of the network in response to at least one boundary node in said set of boundary nodes, wherein each node in said set of target nodes is separated by a sufficient cost from the first tile.

44. A processor readable storage medium as called for in claim 43, wherein each path between each node in said set of target nodes and the first tile has a cost of at least C, wherein C is a predetermined value.

45. A processor readable storage medium as called for in claim 43, wherein each path between any node in a tile containing a node in set of target nodes and the first tile has a cost of at least C, wherein C is a predetermined value.

46. A processor readable storage medium as called for in claim 43, wherein said processor readable program code further includes:

a third program code, said third program code instructing a processor to modify said set of target nodes, after said set of target nodes are identified in response to said second program code, to obtain said set of nodes to be employed in paths extending between nodes in the processor readable representations of the network and nodes in the first tile.

47. A processor readable storage medium as called for in claim 46, wherein third program code instructs a processor to replace a node in said set of target nodes with a node that is closer to said first tile.

48. A processor readable storage medium as called for in claim 43, wherein said processor readable program code further includes:

a third program code, said third program code instructing a processor to determine a path between a node in said set of boundary nodes and a node in said set of target nodes;

a fourth program code, said fourth program code instructing a processor to mark a node in said set of target nodes with a set of nodes in said set of boundary nodes;

a fifth program code, said fifth program code instructing a processor to push back a node in said set of target nodes to identify a fork node;

a sixth program code, said sixth program code instructing a processor to mark said fork node with a set of nodes in said set of boundary nodes that also mark said node being pushed back;

a seventh program code, said seventh program code instructing a processor to add said fork node to said set of target nodes; and an eighth program code, said eight program code instructing a processor to delete said node being pushed back from said set of target nodes.

49. A processor readable medium as called for in claim 48, wherein said processor readable program code further includes:

a ninth program code, said ninth program code instructing a processor to discharge a node in said set of target nodes to reduce an average cost displacement between nodes in said set of target nodes and said first tile.

50. A processor readable storage medium having processor readable program code embodied on said processor readable storage medium, said processor readable program code for identifying a path between an origin node in a first region and a destination node in a second region, wherein the origin node and the destination node are located on a processor readable representation of a network, said processor readable program code including:

a first program code, said first program code instructing a processor to identify a first node, wherein said first program code includes:

a second program code, said second program code instructing a processor to identify a first set of boundary nodes in the first region, and a third program code, said third program code instructing a processor to identify a first set of target nodes in the processor readable representation of the network in response to at least one boundary node in said first set of boundary nodes, wherein each node in said first set of target nodes is separated by a sufficient cost from the first region;

a fourth program code, said fourth program code instructing a processor to identify a second node, wherein said fourth program code includes:

a fifth program code, said fifth program code instructing a processor to identify a second set of boundary nodes in the second region, and a sixth program code, said sixth program code instructing a processor to identify a second set of target nodes in the processor readable representation of the network in response to at least one boundary node in said second set of boundary nodes, wherein each node in said second set of target nodes is separated by a sufficient cost from the second region;

a seventh program code, said seventh program code instructing a processor to commence pathfinding to determine a path between said origin node and said first node;

an eighth program code, said eighth program code instructing a processor to commence pathfinding to determine a path between said destination node and said second node; and a ninth program code, said ninth program code instructing said processor to commence pathfinding to determine a path between said first node and said second node.

51. An apparatus for constructing a set of nodes to be used in paths extending between nodes in a processor readable representation of a network and nodes in a first tile in a processor readable representation of a network, said apparatus comprising:

means for identifying a set of boundary nodes in the first tile; and means for identifying a set of target nodes in the processor readable representation of the network in response to at least one boundary node in said set of boundary nodes, wherein each node in said set of target nodes is separated by a sufficient cost from the first tile.

52. An apparatus as called for in claim 51, further including:

means for determining a path between a node in said set of boundary nodes and a node in said set of target nodes;

means for marking a node in said set of target nodes with a set of nodes in said set of boundary nodes;

means for pushing back a node in said set of target nodes to identify a fork node;

means for marking said fork node with a set of nodes in said set of boundary nodes that also mark said node being pushed back;

means for adding said fork node to said set of target nodes; and means for deleting said node being pushed back from said set of target nodes.

53. An apparatus as called for in claim 52, further including:

means for discharging a node in set of target nodes to reduce an average cost displacement between nodes and said first tile.

54. An apparatus for identifying a set of nodes associated with a first tile in a processor readable representation of a network, said apparatus comprising:

a processor;

a memory, in communication with said processor; and a processor readable storage medium, in communication with said processor and said memory, wherein said processor is programmed to:

identify a set of boundary nodes in the first tile, identify a set of target nodes, wherein each node in said set of target nodes is separated by a sufficient cost from the first tile, determine a path between a node in said set of boundary nodes and a node in said set of target nodes, mark a node in said set of target nodes with a set of nodes in said set of boundary nodes, push back a node in said set of target nodes to identify a fork node, mark said fork node with a set of nodes in said set of boundary nodes that also mark said node being pushed back, add said fork node to said set of target nodes, and delete said node being pushed back from said set of target nodes.

55. An apparatus for identifying a path between an origin node in a first tile and a destination node in a second tile, wherein the origin node and the destination node are located on a processor readable representation of a network, said apparatus comprising:

a processor;

a memory, in communication with said processor; and a processor readable storage medium, in communication with said processor and said memory, wherein said processor is programmed to:

identify a first node, wherein said processor is programmed to perform the following operations in identifying the first node:

identify a first set of boundary nodes in the first region, and identify a first set of target nodes in the processor readable representation of the network in response to at least one boundary node in said first set of boundary nodes, wherein each node in said first set of target nodes is separated by a sufficient cost from the first region, identify a second node, wherein said processor is programmed to perform the following operations in identifying the second node:

identify a second set of boundary nodes in the second region, and identify a second set of target nodes in the processor readable representation of the network in response to at least one node in said second set of boundary nodes, wherein each node in said second set of target nodes is separated by a sufficient cost from the second region, commence pathfinding to determine a path between said origin node and said first node, commence pathfinding to determine a path between said destination node and said second node, and commence pathfinding to determine a path between said first node and said second node.

56. A machine including a processor readable storage medium, said processor readable storage medium containing data representing a set of nodes in a processor readable representation of a network, wherein said set of nodes is generated by a computer implemented method for constructing the set of nodes to be employed in paths extending between nodes in said processor readable representation of the network and nodes in a first region in the processor readable representation of the network, said method comprising the steps of:

(a) identifying a set of boundary nodes in the first region; and (b) identifying a set of target nodes in the processor readable representation of the network in response to a least one boundary node in said set of boundary nodes, wherein each node in said set of target nodes is separated by a sufficient cost from the first region.

57. A machine as called for in claim 56, wherein said method further includes the step of:

(c) modifying said set of target nodes, after said step (b) is completed, to obtain said set of nodes to be employed in paths extending between nodes in the processor readable representation of the network and in the first region.

* * * * *